Sept. 14, 1937.  W. B. PAYNE  2,092,852

CHECK WRITING MACHINE

Filed Dec. 28, 1933   11 Sheets-Sheet 1

INVENTOR
WALTER B. PAYNE
BY Edward H Cumpston
ATTORNEY

Sept. 14, 1937.    W. B. PAYNE    2,092,852
CHECK WRITING MACHINE
Filed Dec. 28, 1933    11 Sheets-Sheet 2
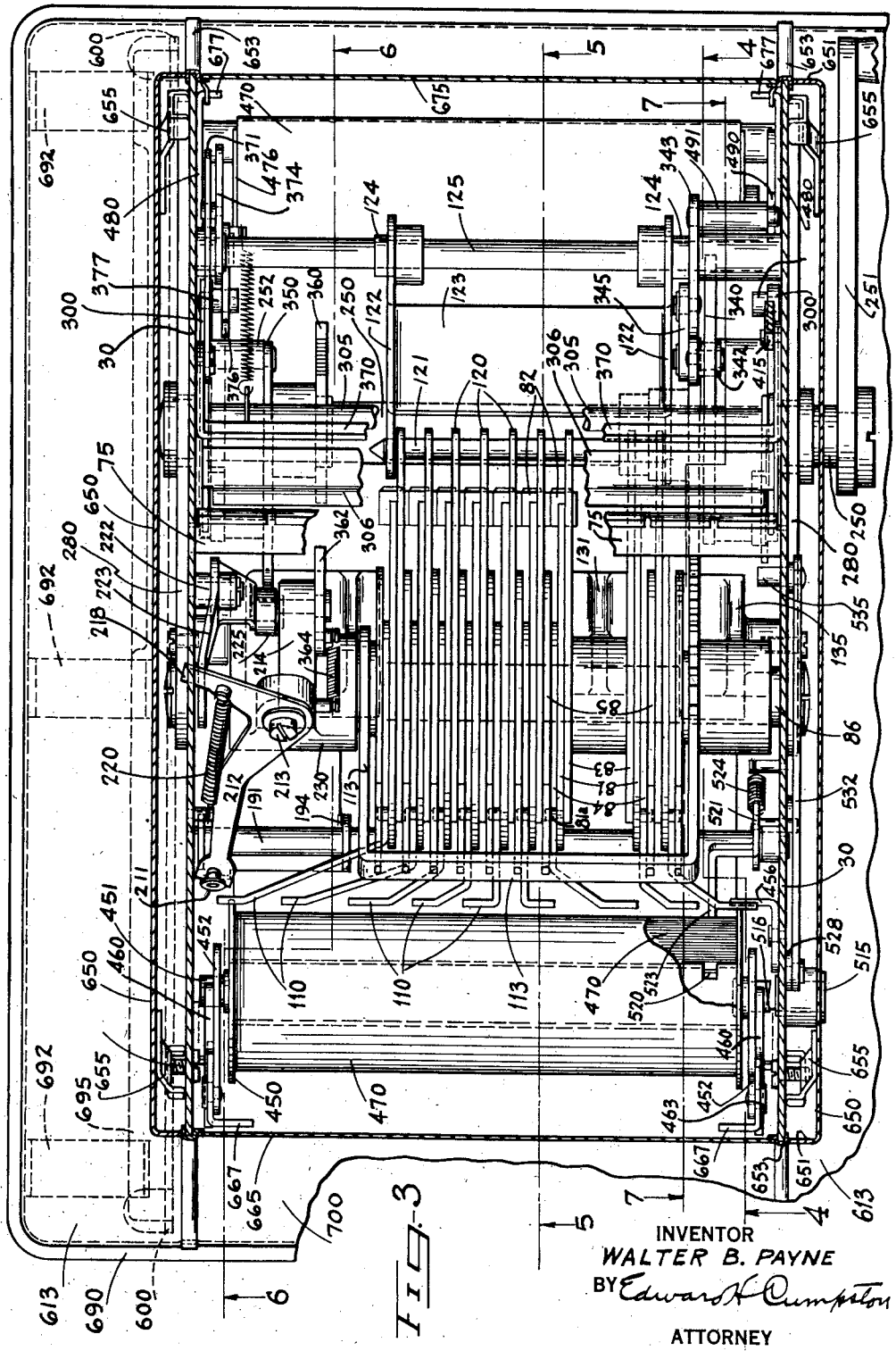
INVENTOR
WALTER B. PAYNE
BY Edward H. Cumpston
ATTORNEY

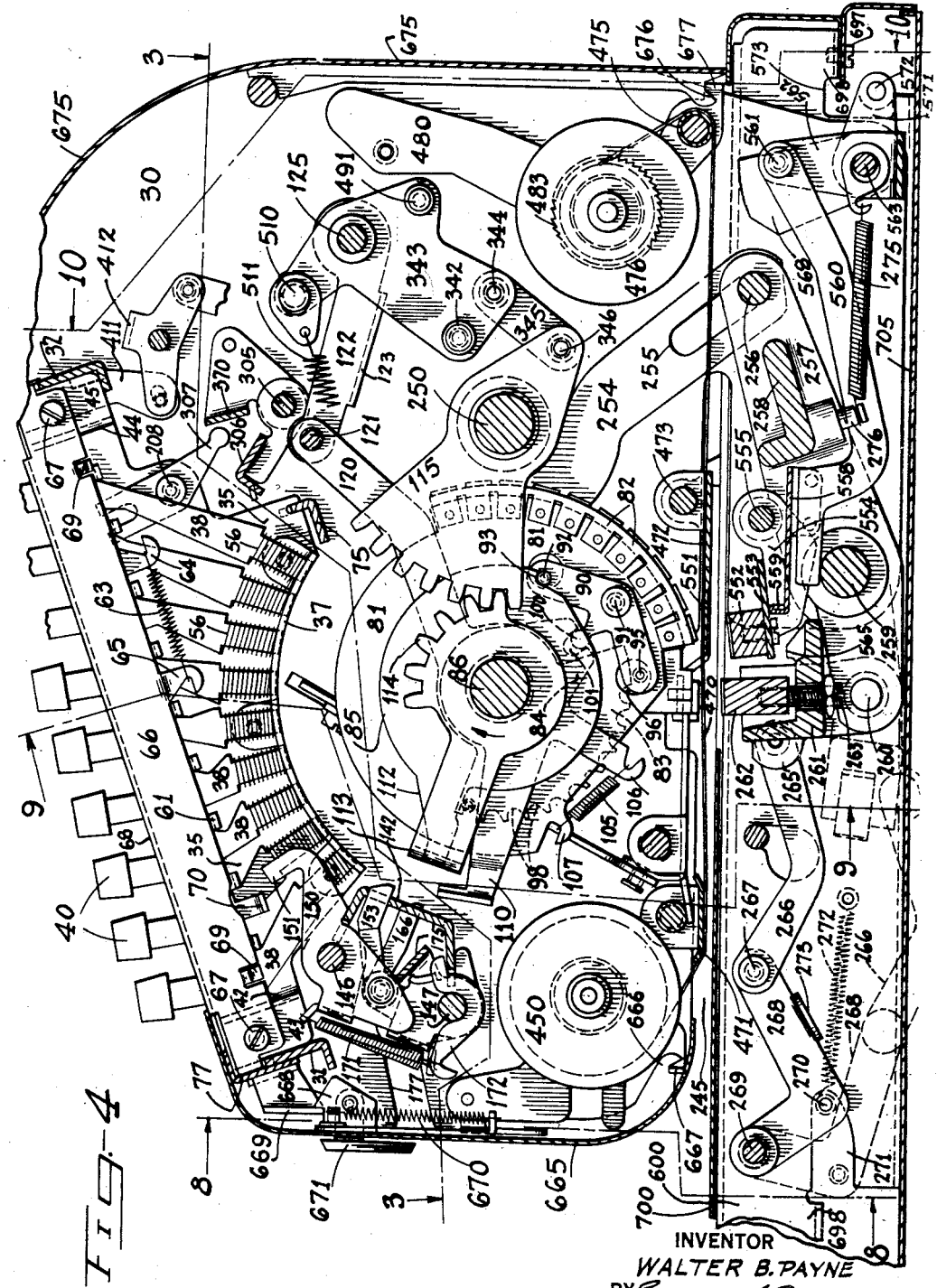

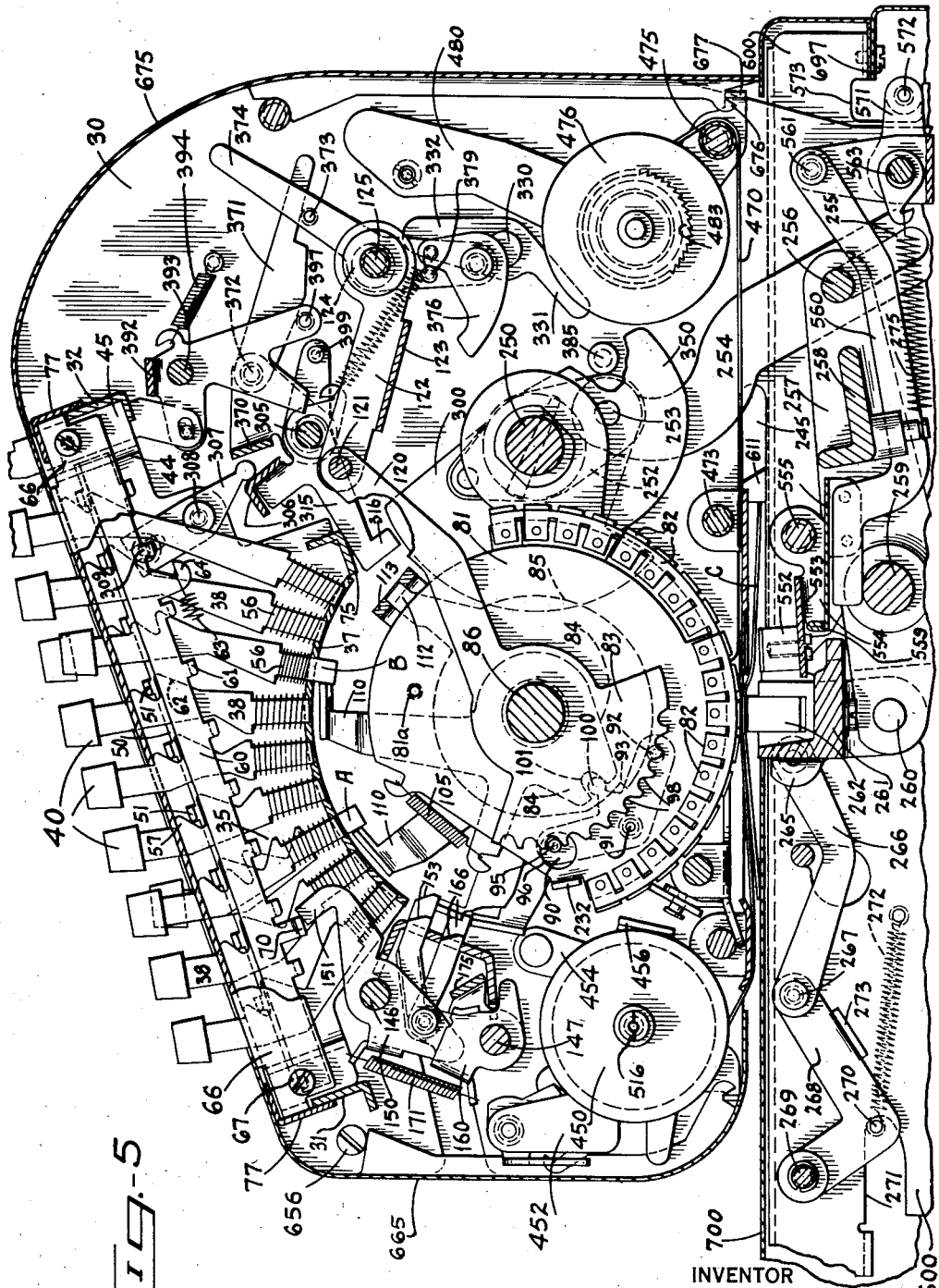

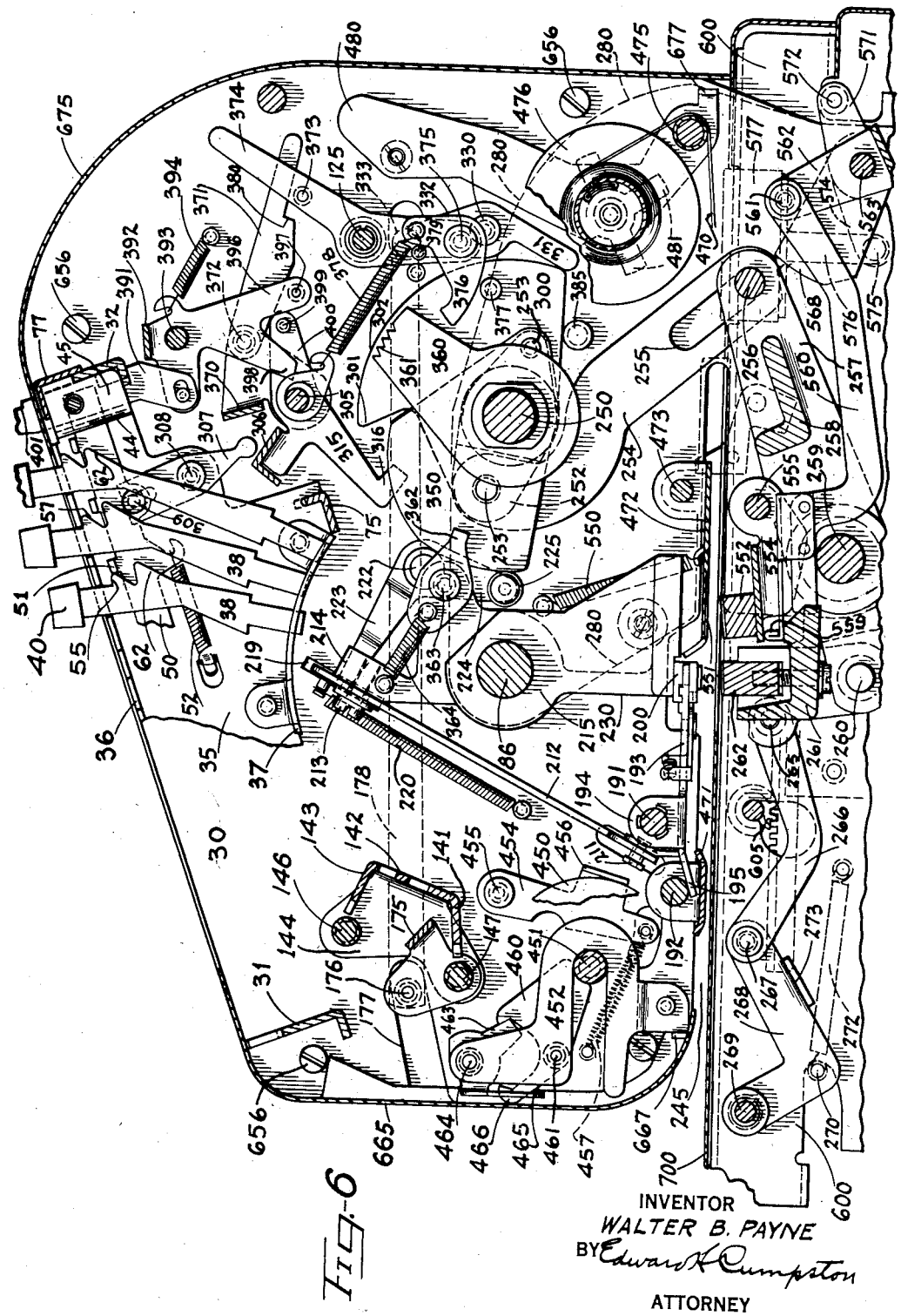

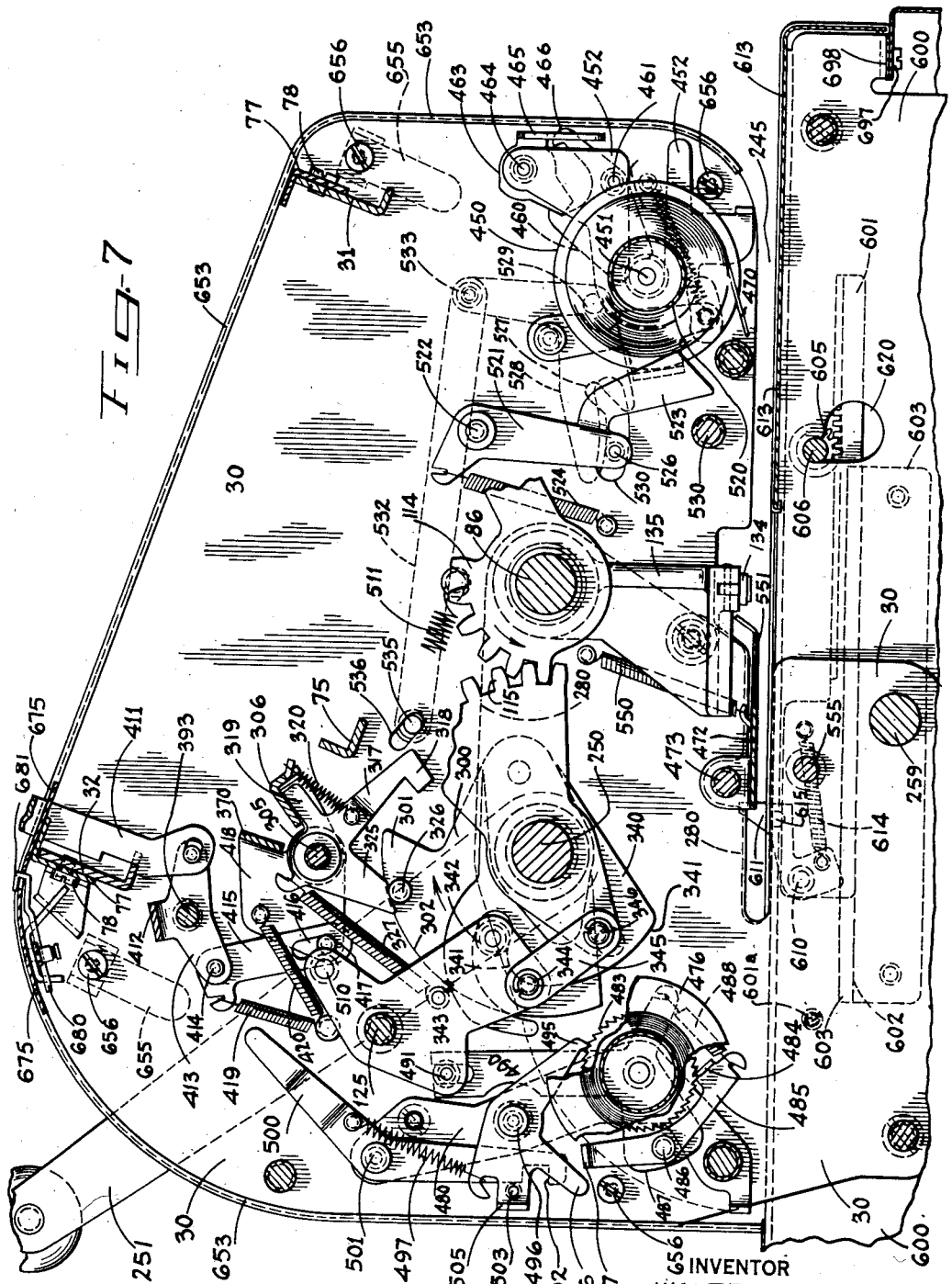

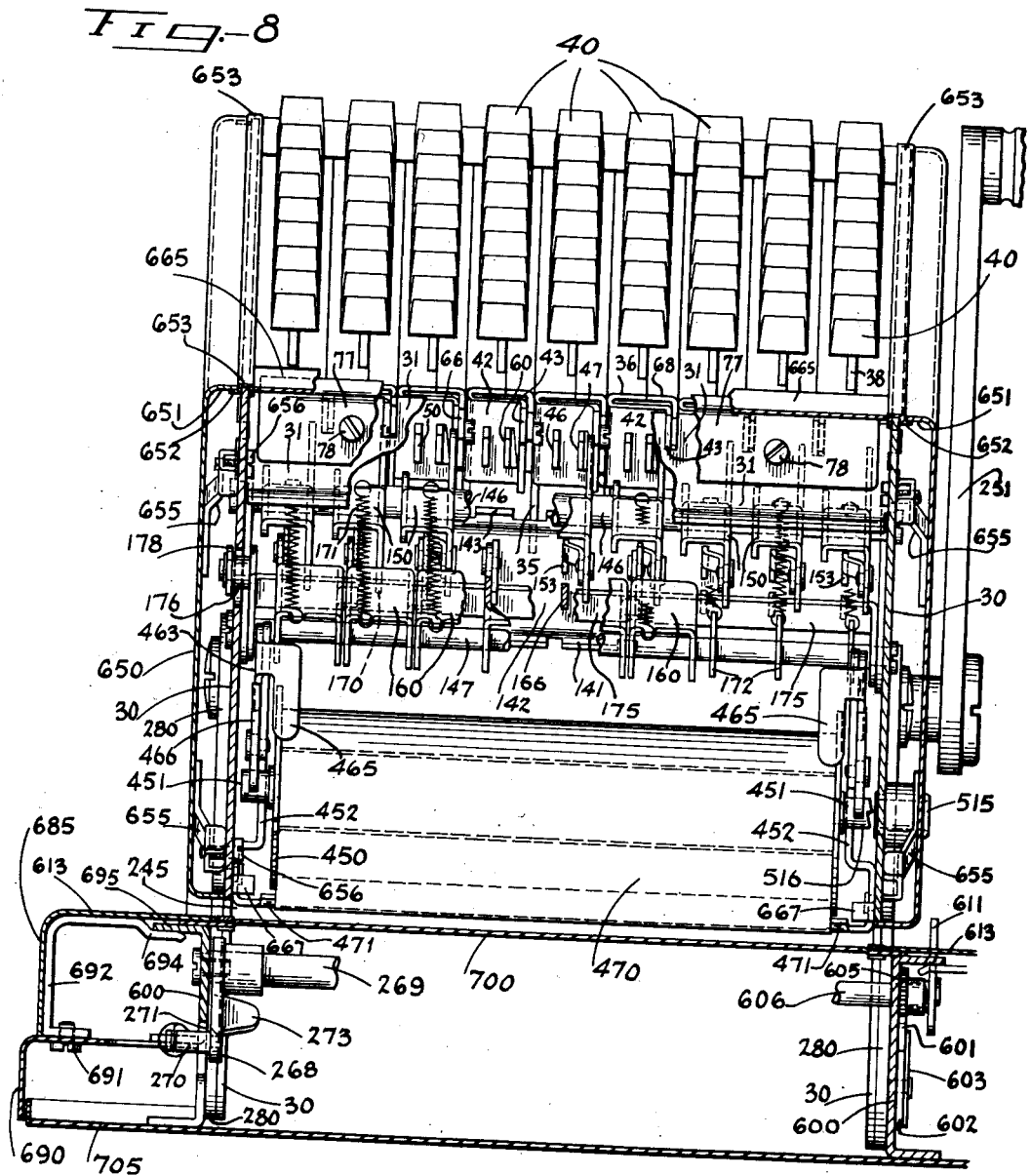

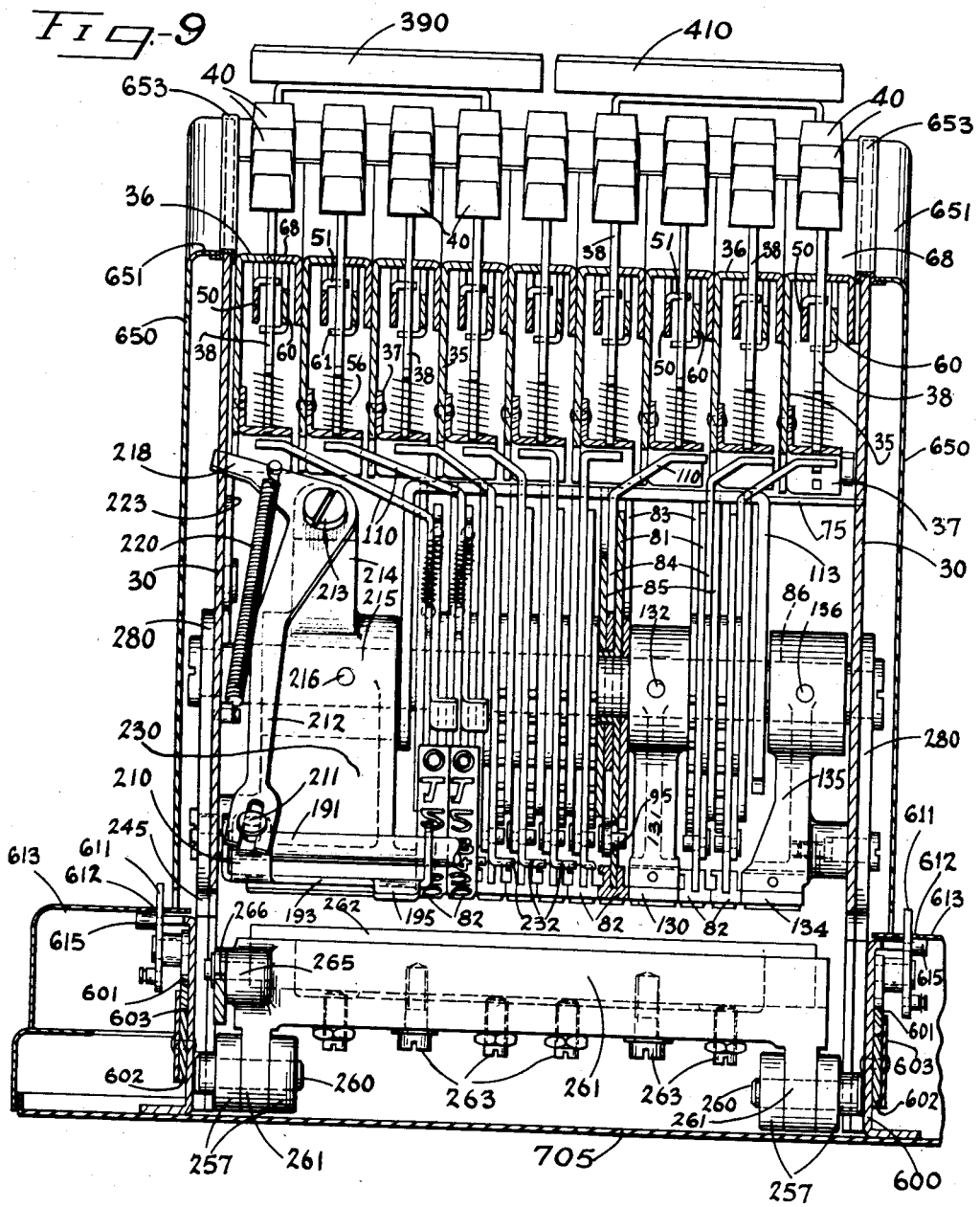

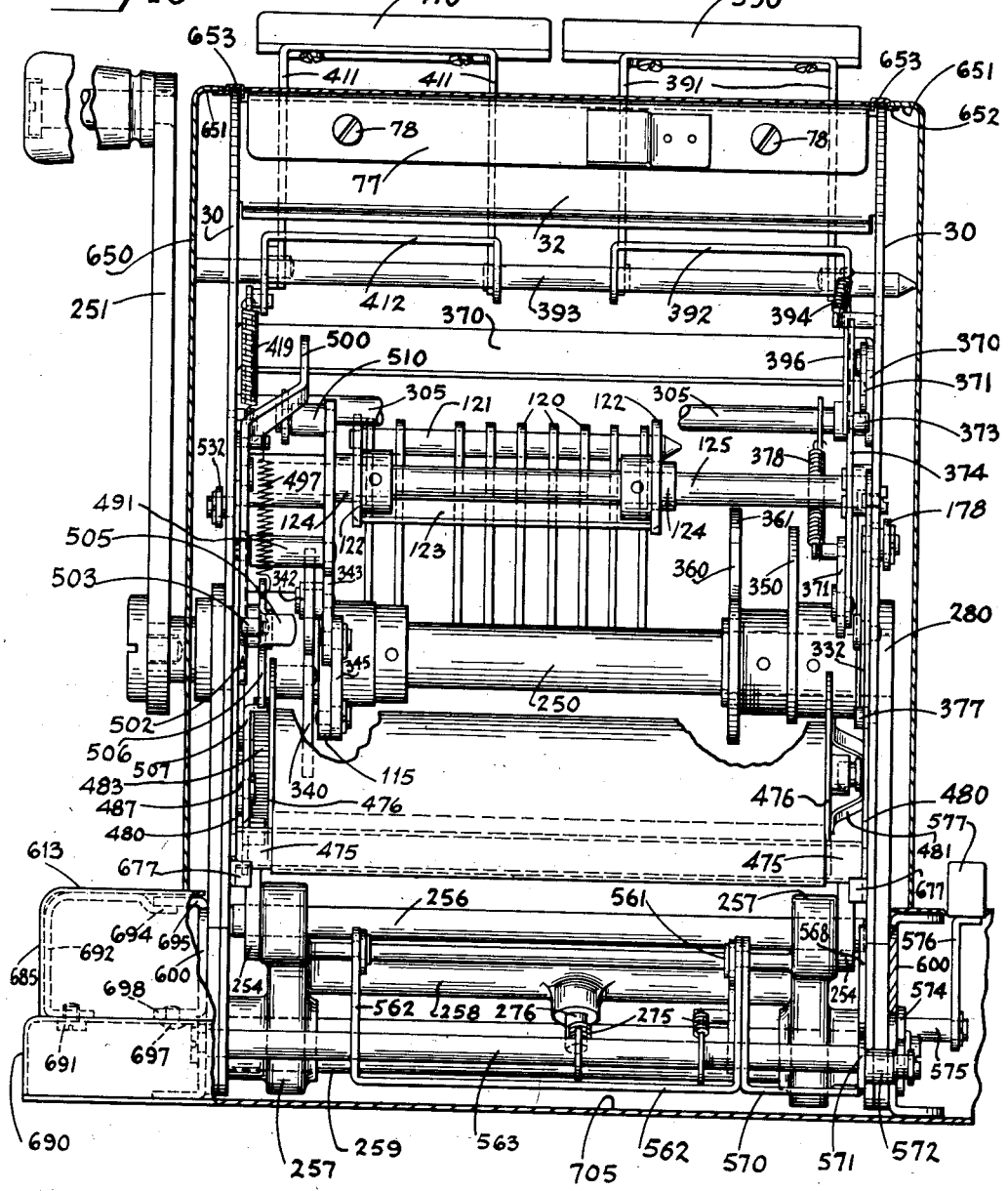

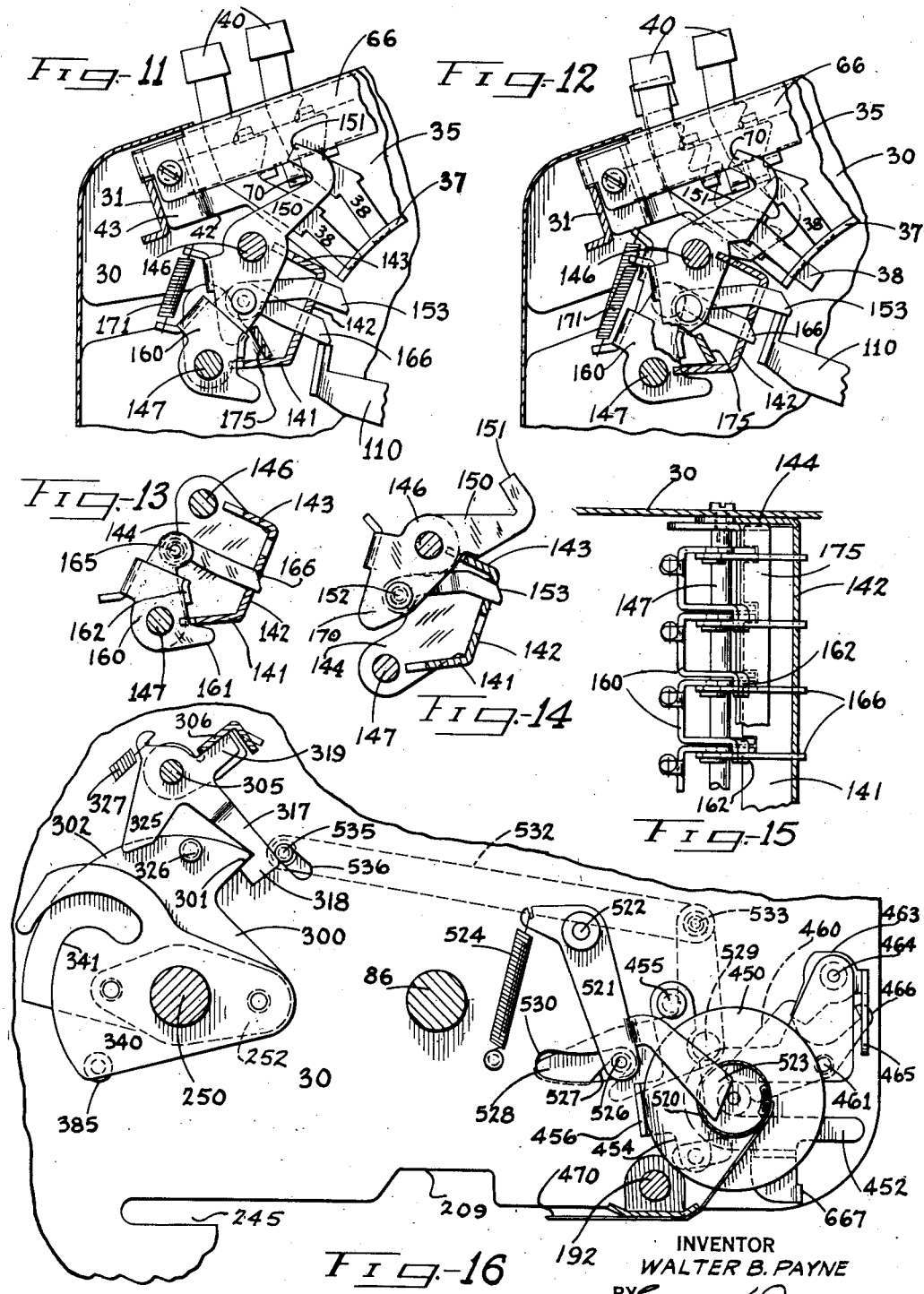
Sept. 14, 1937. W. B. PAYNE 2,092,852
CHECK WRITING MACHINE
Filed Dec. 28, 1933 11 Sheets-Sheet 10
INVENTOR
WALTER B. PAYNE
BY Edward H. Dumpston
ATTORNEY Sept. 14, 1937.   W. B. PAYNE   2,092,852
CHECK WRITING MACHINE
Filed Dec. 28, 1933   11 Sheets-Sheet 11
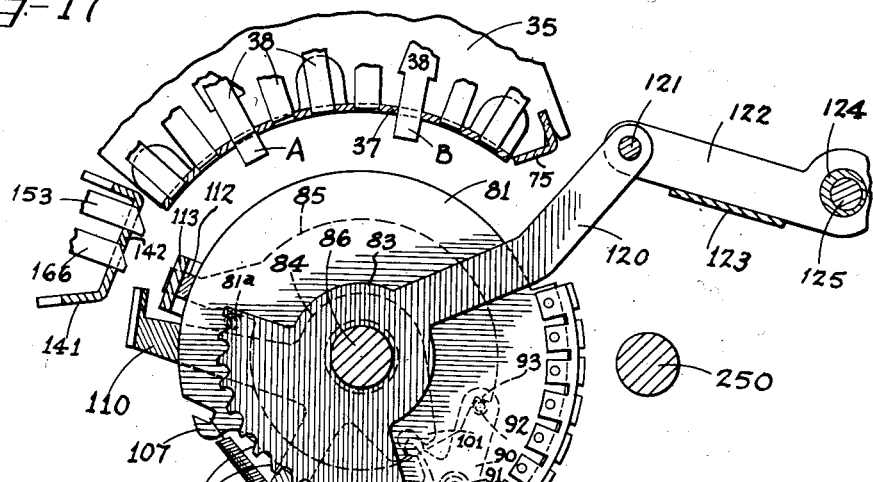
INVENTOR
WALTER B. PAYNE
BY Edward H. Cumpston
ATTORNEY Patented Sept. 14, 1937

2,092,852

UNITED STATES PATENT OFFICE 2,092,852

CHECK WRITING MACHINE

Walter B. Payne, Rochester, N. Y., assignor to The Todd Company, Inc., Rochester, N. Y., a corporation of New York Application December 28, 1933, Serial No. 704,328

41 Claims. (Cl. 101—19)

This invention relates to a machine for printing upon checks, drafts, and the like, in a relatively permanent manner, the amounts or value indications required on such documents, machines of this character being commonly known in the art as check writers.

An object of the invention is the provision of a generally improved and more satisfactory machine of this kind which may be constructed economically, which is of simple design and not likely to get out of order, and which is light, compact, and of neat appearance.

Another object is the provision particularly of a key set check writing machine of attractive and compact design, arranged to print through an inking ribbon.

Still another object is the provision of a machine so designed that various important parts of the machine are constructed as unitary assemblages which may be bodily removed from the machine and bodily replaced when necessary.

A further object is the provision of a machine improved in many different details and respects, as will be apparent from the following description.

To these and other ends the invention resides in certain improvements and combinations of parts, all as will be hereinafter more fully described, the novel features being pointed out in the claims at the end of the specification.

In the drawings:

Fig. 3 is a horizontal section through the machine taken substantially on the line 3—3 of Fig. 4;

Fig. 4 is a vertical section through the machine taken longitudinally on the line 4—4 of Fig. 3, with parts omitted for clearness;

Fig. 5 is a similar view taken on the line 5—5 of Fig. 3;

Fig. 6 is a similar view taken on the line 6—6 of Fig. 3;

Fig. 7 is a similar view, with parts omitted, taken substantially on the line 7—7 of Fig. 3 and looking in the opposite direction from that of Figs. 4 to 6;

Fig. 8 is a vertical section taken transversely of the machine substantially on the line 8—8 of Fig. 4;

Fig. 9 is a similar view substantially on the line 9—9 of Fig. 4;

Fig. 10 is a similar view looking at the machine from the rear, taken substantially on the line 10—10 of Fig. 4, with various parts omitted;

Fig. 11 is a fragmentary vertical section showing details of the keyboard and blank stop and zero stop mechanism, with the parts in one position;

Fig. 12 is a similar view with the parts in a different position;

Fig. 13 is a fragmentary view of certain parts of the blank stop mechanism, to illustrate details;

Fig. 14 is a similar view of certain parts of the zero stop mechanism;

Fig. 15 is a plan of part of the blank stop mechanism;

Fig. 16 is a fragmentary view similar to a part of Fig. 7, illustrating particularly the details of the locking mechanism for preventing operation of the machine when the printing ribbon is exhausted or removed from the machine;

Fig. 17 is a fragmentary view of some of the parts shown in Fig. 5 with certain key stops depressed ready to set up a number when the machine is further operated;

Fig. 18 is a fragmentary plan, with parts in section, of a prefix type character and associated mechanism, and Fig. 19 is a sectional view through the prefix character and its carrier, taken substantially on the line 19—19 of Fig. 18.

The same reference numerals throughout the several views indicate the same parts.

General outline

Figure 1:
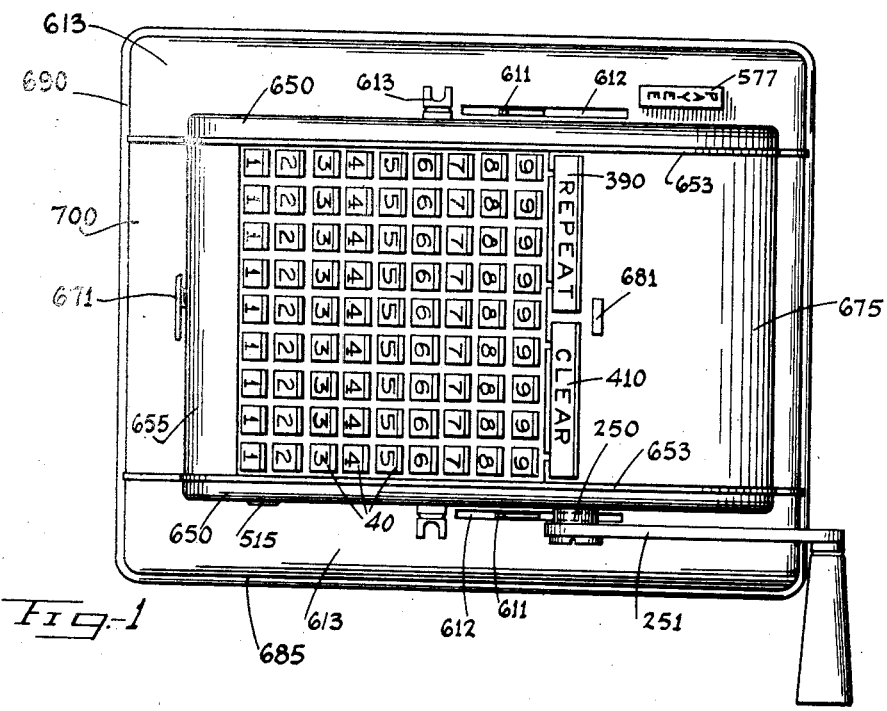
Fig. 1 is a plan of a check writing machine constructed in accordance with a preferred embodiment of the invention.

It will be helpful in understanding the coordination of the various detailed parts of the mechanism if a brief outline of the principal parts is given.

The machine comprises a keyboard made up of separate units, one in each denomination, each denominational unit having a series of nine keys numbered from 1 to 9 inclusive. The depression of any key in each denomination sets a stop positioned in accordance with the numerical value of the key.

Blank stops are also provided, one in each denomination above the unit of dollars denomination, and zero stops are provided, one in each denomination. The zero stops are moved to effective position in each denomination where no key has been depressed, and the blank stops are moved to effective position in each denomination above the highest denomination in which a key has been depressed.

The printing elements comprise type segments mounted upon type disks, there being one disk and segment for each denomination, all the disks being mounted for rotation about a common shaft. Associated with each type disk is a driver, a latch connecting the disk to the driver, a controller for unlatching the latch, and a stationary locking member to which the type disk is latched when it is unlatched from the driver.

After the desired keys have been depressed to determine the amount to be printed by the machine, operation of the main shaft of the machine turns all the drivers of the various denominations through a predetermined amount and each driver carries its associated type disk along with it until the controller associated with that type disk comes into contact with the first set stop in that denomination, which stop may be either a key stop or the blank stop or zero stop. When the controller contacts with the stop, the type disk is unlatched from the driver and latched to the locking member, so that the driver continues its full extent of movement but does not carry the type disk any further. Thus the various type disks of various denominations are set in various positions in accordance with the keys depressed.

Further actuation of the main shaft results in forcing a movable platen toward the type segments so that an impression is made on a piece of paper or the like inserted between the type segments and the platen. The machine in its preferred form prints through a ribbon interposed between the type segments and the paper.

A movable "prefix character" is also provided for printing a dollar sign or any desired wording immediately adjacent the highest denomination to be printed by the machine.

There are, of course, many other features in the machine such as key locks, ribbon feeding mechanism, and crimping mechanism for crimping the "payee" line of the check, or draft, but the above brief outline will be sufficient for the present purpose of aiding in a proper understanding of the detailed description which follows.

*Frame and keyboard*

Rising from a suitable base are two substantially vertical frame plates 30 of rigid construction, one extending along each side of the machine from front to back. Secured to these frame plates and extending transversely across the machine from one side plate to the other are two angle irons 31 and 32 (Figs. 4 to 7). Each of these angle irons 31 and 32 has a series of notches extending downwardly from its upper edge, corresponding notches in the front angle iron 31 and the rear angle iron 32 being alined with each other so that the front and rear ends of the vertical plates forming a part of each keyboard unit may be inserted in and held by these notches, as may be seen especially from Figs. 4, 5, and 8.

The keyboard units for the various denominations may be all alike, and are best shown in Figs. 4, 5, 6, 8, and 9. Each unit comprises a vertical plate 35 extending from front to back of the machine and having its upper edge bent over as at 36. The lower edge of each plate 35 is of concave arcuate shape, concentric with a shaft 86 below it, and has fastened thereto a segment 37 likewise of arcuate shape having slots through which the lower ends of the key stems 38 extend. Each key stem near its upper end is guided in a notch in the edge of the turned over part 36 of the plate 35 and extends upwardly beyond the plate 36 and is provided with a depressible head or key 40.

Near the front end of each keyboard unit the plate 35 is offset laterally as at 42 (Fig. 8) and then extends forwardly again as at 43 and into the notch of the front angle iron 31. A similar offset is provided at 44 near the rear of the plate 35 and the plate then continues rearwardly at 45 into the notch of the rear angle iron 32. The offsets 42 and 44 are provided with notches 46 and 47 (Fig. 8), the former in a plane just to the left of the plane of the key stems 38 and the latter in a plane just to the right of the plane of the key stems. The notches 46 are rectangular notches and receive the ends of a key locking bar 50 (Figs. 6 and 8) which lies just to the left of the key stems 38 and is slidable longitudinally back and forth in its notches 46. The locking bar 50 carries a series of laterally extending ears 51, one just to the rear of each key stem, and a coiled spring 52 secured at one end to the bar 50 and to the other end to an ear on the plate 35, tends to pull the locking bar 50 in a forward direction so that when any key is depressed the lug 51 associated with that key will snap over the top of a shoulder 55 to hold the key depressed against the force of a coiled spring 56 surrounding the lower end of each stem and tending to push upwardly on the key stem.

The shoulder 55 on each key stem is normally in contact with the lower side of the plate 36 and serves to limit the upward movement of the key stem. When any one key is depressed, however, the locking lug 51 of the locking bar 50, by snaping over the shoulder 55, holds the key in depressed position. If a second key in the same denomination be depressed, an inclined cam surface 57 on the key stem, just below the shoulder 55, will contact with one of the locking lugs 51 and force the locking bar 50 in a rearward direction, thus releasing any key previously depressed in this same denomination, although the newly depressed key will be locked in its depressed position.

Lying just to the right of each row of key stems, that is, on the opposite side of the key stems from the locking bar 50, is a control bar 60 (Figs. 5, 8, and 9) having its ends slidable in the slots 47 and having along its lower edge a series of laterally extending ears 61, one lying just to the rear of each key stem. Each key stem has a second inclined cam surface 62 (Fig. 6) below the inclined surface 57, in position to cooperate with the adjacent ear 61. When any key in any bank of keys is depressed, the inclined cam surface 62 of the depressed key pushes rearwardly upon the adjacent ear 61 of the control bar 60 associated with that particular bank of keys and moves this control bar 60 in a rearward direction against the influence of a spring 63 (Fig. 4) the rear end of which is fastened to a hook 64 on the control bar 60 and the front end of which is fastened to a hook 65 on a vertical plate 66 which overlies the control bar and is fastened at its ends, as at 67, to the front and back offset ends 43 and 45 of the plate 35. The upper edge of the plate 66 is bent over at a right angle as at 68 and cooperates with the portion 36 of the plate 35 to form a smooth top for each keyboard unit. The left hand edge of each portion 68 contacts with the right hand surfaces of the key stems and with the right hand edge of the plate 36 in the spaces between the key stems, as is apparent from Figs. 8 and 9.

For ease of assembly, the slots 47 (Fig. 8) through which the ends of the control bar 60 extend are tapered from top to bottom and considerably wider at their bottom edges than the thickness of the control bar 60. Thus, when any keyboard unit is removed from the machine and when the plate 66 is removed from the unit, the control bar 60 may be tilted slightly, pulling its lower edge in a direction away from the key stems far enough so that the ears 61 will slide over the surfaces of the key stems, and then the bar 60 may be slid longitudinally until one end is pulled out of its slot 47, after which the bar can be slid in the opposite direction until the other end is pulled out of its slot. When the control bar 60 is removed, each individual key stem can be readily removed simply by lifting its upper end slightly out of its notch in the plate 36 and then pulling the stem outwardly to release its lower end from the slot in the plate 37. When all the key stems have been removed, the latching bar 50 can be moved longitudinally to a sufficient distance to release one end from its slot 46 and then its other end from its slot. Thus each keyboard unit when conveniently removed from the machine, can be readily disassembled in the manner described, and reassembled by a reverse process. When the unit is assembled and the plate 66 is in place, ears 69 (Fig. 4) struck down from the lower edge of the plate 66 lie against the right hand surface of the control bar 60 and hold it in proper position, preventing it from tilting rightwardly in its wide slot.

The purpose of each control bar is to control the zero stop and blank stop mechanism. To this end, each control bar carries a rightwardly extending ear 70 which has a position such as shown in Fig. 4 when no key has been depressed in its associated bank of keys, and which has a second position as shown in Fig. 5 when any key in that bank of keys has been depressed. The zero stop and blank stop mechanism, controlled by the position of this ear 70, will be described in detail below.

It will be noted especially from Figs. 5 and 6 that the upper portions of the key stems 38, which are guided in the notches of the top plate 36, all extend in an upward direction substantially parallel to each other. The lower portions of the various key stems in any one bank which are guided in slots in the arcuate plate 37, are not parallel to each other but are arranged approximately radially with respect to the arc of this plate 37. Thus except for a few keys near the center of each bank, the lower part of the key which extends through the plate 37 is at an angle to the upper part of the key which extends through the notch in the plate 36. As each key is depressed, therefore, it has a somewhat tilting action, the upper part of each key moving downwardly in one direction and the lower part of each key moving at an angle thereto in a direction approximately radially of the plate 37 and approximately toward the shaft 86, which is the center of rotation of the controllers which cooperate with the key stems in the manner explained below.

To provide a still more firm and rigid support for the keyboard units than that furnished merely by the angle irons 31 and 32, the machine is provided with a third angle iron 75 extending across from one side plate 30 to the other, and this angle iron 75 has notches in its upper edge cooperating with notches in the lower rear corners of the plates 35 of the various key banks, so that the notches interlock with each other. Thus each keyboard unit is supported primarily by the angle irons 31 and 32, in the notches of which it loosely rests, and it also has a third point of support on the angle iron 75, which prevents any transverse tilting of the unit and also aids in holding it against movement forwardly or rearwardly.

The keyboard units are held in place in the notches of the angle irons 31, 32, and 75, by means of angle bars 77 (Figs. 4 to 7) which have flanges overlying all of the keyboard units at their front and rear ends, and which are fastened to the angles 31 and 32 by screws 78 (Fig. 7). When the angle bars 77 are removed, each keyboard unit may be readily taken out simply by lifting it upwardly out of its slots in the members 31, 32, and 75, there being no other parts to be disconnected.

*Type unit*

The type unit, comprising the printing types and the mechanism for setting these types in proper position for printing, will now be described with special reference to Figs. 3, 4, 5, 9, and 17.

In each denomination in which numerals are to be printed, there is an assemblage comprising a type disk 81 carrying a type segment 82, a locking member 83 on one side of the type disk, a controller 84 on the opposite side of the type disk, and a driver 85 on the opposite side of the controller from the type disk. All of these elements in the various denominations are mounted on a cross shaft 86 which is firmly secured at opposite ends to the side plates 30 and preferably also to reinforcing brackets 280. The locking member 83 is stationary and preferably has a bearing directly on the shaft 86 but is rotatable on the shaft for purposes of adjustment. The other elements above mentioned are all mounted for rotation on the shaft 86 and normally do rotate during the setting up of the numbers to be printed. The type disk 81 preferably bears directly on the shaft 86 and has a flange or hub extending laterally in one direction around the shaft, while the controller 84 and driver 85 are rotatably mounted side by side on the flange of the type disk with which they are associated, as seen in Fig. 9.

Each type segment 82 has a series of type faces formed thereon representing digits from 1 to 9 inclusive, and a zero next to the 1. These type segments may be of any suitable form, being made, for example, in the manner disclosed in the copending application of William Uhl and Gordon W. Wolfe, Serial No. 647,172, filed December 14, 1932, now issued as Patent No. 2,011,092, granted August 13, 1935.

Each type disk 81 carries a latch 90 pivoted near its middle to the type disk at 91 and lying on the side of the disk toward the driver 85. The latch 90 is in a plane between the type disk 81 and the driver 85; that is, in the plane of the controller 84. The rear end of each latch 90 carries a pin 92 extending laterally into the plane of the driver 85 and arranged under predetermined conditions to engage a shoulder 93 (Figs. 4 and 17) on the driver 85.

The opposite or forwardly extending end of the latch 90 carries a pin 95 extending through a large hole 96 in the type disk 81 and projecting to the opposite side of the type disk, into the plane of the locking member 83. This pin 95 is arranged to engage under predetermined conditions in any one of a series of notches 98 (Figs. 5 and 17) formed on a portion of the periphery of the locking member 83.

Each latch 90 has a third arm extending approximately radially inwardly from the pivot 91 of the latch, which arm has a rounded end 100 fitting in a notch 101 (Figs. 4 and 5) of the controller 84. It is apparent from this description and particularly from Fig. 4 of the drawings, that when the controller 84 moves in a clockwise direction with reference to the type disk 81, this tends to move the latch 90 in a counterclockwise direction about its pivot 91, and to move the pin 92 inwardly into the path of the shoulder 93. A spring 105 connected at one end to an arm 106 on the controller 84 and at the other end to a lug 107 on the type disk 81 constantly tends to move the controller in such a clockwise direction relatively to the type disk 81 and thus constantly tends to hold the pin 92 in the path of the shoulder 93. If the controller 84 be moved in a counterclockwise direction relatively to the type disk 81, however, then this will move the latch 90 in a clockwise direction about its pivot 91, which will shift the pin 92 outwardly away from the shoulder 93 and shift the pin 95 inwardly into one of the notches 98. Since the locking member 83 in which the notches 98 are formed is stationary, the entry of the pin 95 into one of these notches will latch the type disk 81 to the stationary locking member 83 and thus hold the type disk stationarily in the position to which it has been set.

Each of the controllers 84 is provided with an outwardly extending arm 110, the outer end of which is bent laterally as shown especially in Figs. 3 and 9. As the respective rows or denominations of keys are spaced laterally through a materially greater distance than the desired distance between successive printed digits, these arms 110 fan out as indicated in the above mentioned figures, so that although the controllers 84 of successive denominations may be relatively close to each other, yet the outer ends of the arms 110 lie in proper position to cooperate with the keys of the proper denominations. As the various controllers turn around the shaft 86, the ends of the arms 110 sweep around in line with the respective key stems 36 and contact with the ends of depressed keys in the respective denominations, as shown, for example, in Fig. 5.

Each driver 85 has an arm 112 which extends radially outwardly to a point slightly beyond the periphery of the type disk 81 and the ends of all of the arms 112 of all of the drivers are securely fastened in a bail 113, which is mounted for rotation on the shaft 86 and which is provided at one end with gear teeth 114 meshing with teeth on a gear segment 115 mounted for rotation on the main operating shaft 250 and operated in a manner described below, under the heading "Operating mechanism."

When the segment 115 is operated in a counterclockwise direction from its rest position shown in Fig. 4, it turns the bail 113 in a clockwise direction from the position shown in this figure to a position such as shown in Fig. 5. This swings all of the drivers 85 of all of the denominations in a corresponding clockwise direction and, through the latches 90, carries the type disks 81 likewise in a clockwise direction so long as the type disks remain latched to the drivers. When the arm 110 on any controller 84 is stopped, however, as by hitting a key stop or by hitting one of the zero stops or blank stops described below, then the spring 105 stretches and the driver 85 continues to drive the type disk 81 through a slight distance without driving the controller 84. This causes the type disk to move in a clockwise direction relatively to the controller 84 and thus unlatches the type disk from the driver and latches it to the locking member 83 in the manner above described. The driver 85 then continues through the rest of its range of movement, but without causing further movement of the type disk 81. During its further range of movement, the pin 92 on the latch 90 rides on a smooth concentric surface of the driver which lies beyond the shoulder 93, and this holds the latch with the latch pin 95 positively engaged in one of the notches 98 of the locking member 83.

As previously stated, the locking members 83 are normally stationary on the shaft 86, but they are capable of slight movement for purposes of fine and accurate adjustment so that the notches 98 may be brought to exactly the right position to hold the type disks 81 in position with the type faces on the segments 82 accurately alined with the printing platen. In order to accomplish this adjustment, each locking member 83 is provided with a rearwardly and upwardly extending arm 120 which at its upper rear end encircles a floating shaft 121 (Figs. 3, 4, 5, and 17). The shaft 121 in turn is held by the forward ends of two arms 122 joined to each other by a web 123. The rear ends of these arms 122 form eccentric straps encircling two eccentrics 124 fixed to a cross shaft 125 rotatably mounted in the side frame plates 30. Suitable clamping screws hold this shaft 125 normally against rotation.

When it is desired to adjust the position of the locking members 83, the shaft 125 is turned slightly. Because of the eccentrics 124, this moves the arms 122 slightly in a longitudinal direction; that is, toward the front or back of the machine. This causes corresponding movement of the floating shaft 121 to which the arms 120 on the locking members 83 are connected, and thus turns the locking member slightly about the shaft 86, enabling a simple and accurate adjustment to be made.

The type assemblages of the various dollar denominations are preferably arranged side by side close to each other in a group, as shown in Fig. 9, and spaced somewhat from the type assemblages of the units of cents and tens of cents denominations. Between these two groups there may be a stationary type member 130 mounted on an arm 131 pinned to the shaft 86 at 132, for printing any desired subject matter, such as the word "and" or the sign "&". Similarly, to the right of the units of cents denomination there may be another stationary type character 134 mounted on an arm 135 fixed to the shaft 86 by a pin 136, which type character may print any desired matter, such as the word "cents" or the sign "¢".

For various reasons of manufacture and ease of assembly, it is desired in the units of cents and tens of cents denominations to have the various elements making up the type assemblages in a reverse order from that in the dollar denomination. For example, as shown in Fig. 9, the type assemblage elements in each of the dollar denominations are in the following order from left to right: driver 85, controller 84, type disk 81, and locking member 83. In the units of cents and tens of cents denominations, however, the order is preferably reversed, reading from left to right: locking member 83, type disk 81, controller 84, and driver 85.

Each type disk 81 carries a stud 81a extending laterally into the plane of the arm 112 on the associated driver 85. When the drivers are returned to normal rest position after each printing operation, they engage the studs 81a and return all of the type disks 81 to their normal rest positions.

*Zero stops and blank stops*

It is apparent from the foregoing description of the type mechanism and its operation that if there is no stop to contact with the arm 110 of the controller 84 in any particular denomination, then the swinging of the bail 113 through its normal movement would carry the type disk 81 all the way along to its maximum extent of movement, which would take it to or slightly beyond the position for printing the numeral "9". Obviously if no key has been depressed in any particular denomination, it is not desired to print "9" in that denomination. Nothing at all should be printed if no key has been depressed in any higher denomination, and a zero should be printed if a significant digit is being printed in any higher denomination. In the present machine this printing of the zeros or printing nothing at all is arranged for by means of what might be called "zero stops" and "blank stops", which will now be described with special reference to Figs. 4, 5, 8, and 11 to 15 inclusive.

Extending across the machine below the front end of the keyboard is a somewhat channel-shaped member having a bottom flange 141, a middle flange 142, and a top flange 143. The ends of the middle flange 142 are bent over as at 144 and lie against the inner surfaces of the side plates 30 of the machine.

Two cross shafts extend across the machine and through the ends 144 of the channel. One of these, shown at 146, is near the top of the channel, and the other 147 is near the bottom. Both shafts are held by screws extending inwardly through the side plates 30 and into the ends of the shafts. When the screws are removed, both of the shafts and the channel and all of the mechanism carried by them can be readily removed from the machine as a single unit.

On the upper shaft 146 are rotatably mounted a series of levers 150, one beneath each keyboard unit. Each lever has a portion bent back into somewhat U-shaped form or bail form as shown in Fig. 8, so that each has two spaced bearings on the shaft and is firmly supported thereon. The upper flange 143 of the channel member is notched to receive the levers 150 as shown in Figs. 8 and 11, so that it holds the levers against movement longitudinally along the shaft 146 while permitting them to oscillate on the shaft.

At the upper rear edge of each lever 150 is a nose 151 so positioned that when the control lug 70 on the control bar 60 is in its forward position (Figs. 11 and 12) the nose 151 can pass by this lug without contacting with it, but when any key in any particular denomination has been depressed, then the control lug 70 of that denomination, having been moved rearwardly to the position shown in Fig. 5, lies in the path of the nose 151 and prevents upward movement of this nose, as shown in Fig. 5.

Slightly below the shaft 146, each lever 150 has pivoted to it at 152 (Fig. 14) an arm 153 which extends rearwardly through a slot in the middle portion 142 of the channel member, and which forms a zero stop for cooperation with the arm 110 of the controller 84 of that particular denomination. The construction of the lever 150 and zero stop arm 153 is best shown in Fig. 14, which is a view of these parts with the blank stop mechanism removed for greater clarity.

The zero stops 153 lie in the vertical planes of the respective key stops 38, and each zero stop is one space forwardly of the "1" key stop of its same denomination. This corresponds with the placing of the type characters on the type segments 82, on which the "0" type is next to the "1" type.

It is thus apparent that if, in any particular denomination, no key 40 has been depressed, the control lug 70 of that denomination will be in its forward position and the zero stop lever 150 can turn in a counterclockwise direction about its shaft 146 (such turning being caused in a manner explained below), thus throwing the zero stop arm 153 rearwardly to project this zero stop into the path of the controller arm 110 of that denomination. Then when the bail 113 is turned, the driver 85 of that denomination will turn the type disk 81 only through a slight amount until the controller arm 110 comes into contact with the projected zero stop 153, which stops further movement of the controller 84, unlatches the type disk 81 from the driver 85, and latches it to the locking member 83, in a position in which the "0" type is set at the printing line.

It is desired, as usual, not to print a zero in any denomination above the highest significant digit, except in the case of the units of dollars denomination and the units and tens of cents denominations. Even if the amount to be printed is less than ten cents, it is nevertheless desired always to print a zero in the units of dollars denomination and in the tens of cents denomination, but in all of the higher denominations, above the units of dollars, no useless printing of zeros is desired.

In order to avoid printing useless zeros, blank stop levers 160 are provided, pivoted on the shaft 147, one of such levers being provided for each denomination above the units of dollars denomination, but none for units of dollars, nor units or tens of cents. Each of these blank stop levers 160, as best shown in Figs. 8, 11, 13, and 15, is of U-shaped form so that it has two spaced bearings on its shaft 147, and edges of the lever are engaged in notches of the lower flange 141 of the channel member in order to hold the levers 160 against movement longitudinally along the shaft. Each lever 160 has a tail 161 extending rearwardly beneath the flange 141 and serving to limit motion of the lever in a counterclockwise direction when viewed as in Fig. 13. The right hand side plate of each lever also has a bent over ear 162 overlying the rear edge of the left hand side plate of the next lever to the right. Consequently, if any lever 160 be held in its counterclockwise position as shown in Fig. 13, the ear 162 on this lever will hold the next lever 160 to the right in the same position. Thus each lever 160 controls the levers to the right of it, in known manner, but does not affect levers to the left.

On the left hand side plate of each lever 160 is an upward extension to which is pivoted at 165 a blank stop arm 166 which extends forwardly through a slot in the middle flange 142 of the channel member, and the rear end of which lies in the same vertical plane with the rear end of the zero stop 153 and the key stems 38 of the same denomination. When any lever 160 is turned in a counterclockwise direction to the limit of its motion, to the position shown, for example, in Figs. 5 and 13, then its connected blank stop arm 166 is withdrawn to an ineffective position.

But when any lever 160 is turned in a clockwise direction from the position shown in Fig. 13 to the position shown, for example, in Fig. 11, then the blank stop arm 166 connected to that lever is thrust rearwardly to an effective position in the path of the controller arm 110 of that denomination, and lies one step in advance of the zero stop arm 153 of the same denomination.

The type segments 82 end just beyond the "0" printing type, so that in the next step beyond the zero there is no printing type, and the type disk 81 is cut away to provide an open space immediately beyond the zero type. Hence if the type disk and its type segment be positioned one step in a counterclockwise direction from the position in which the zero is alined with the printing platen, there will be no type alined with the printing platen and nothing will be printed. Since the blank stop arm 166 lies one step in advance of the zero stop arm 153, it is seen that contact of the controller arm 110 with the projected blank stop 166 will have the effect of stopping rotation of the type disk 81 one step before the zero type is brought into alinement with the platen, and thus in this denomination there will be no numeral printing type set at the printing line.

A tail 170 projecting downwardly and forwardly from each zero stop lever 150 extends into the open space within the blank stop lever 160 of the same denomination, in the manner indicated in Figs. 5, 8, and 11, in such manner that when the lever 150 is turned in a clockwise direction, its tail will engage a part of the lever 160 and turn the latter in a counterclockwise direction. A spring 171 is connected at its lower end to an ear on the lever 160 and at its upper end to an ear on the lever 150 of the same denomination in the manner shown in Figs. 5 and 11. In those denominations in which there is no lever 160 (that is, the units and tens of cents and units of dollars denominations) the lower end of each spring 171 is connected to a clip 172 (Figs. 4 and 8) which partially encircles the shaft 147 and which has a tail engaged with the lower flange 141 of the channel member to hold the clip against turning in a clockwise direction.

Also mounted on the shaft 147 is a bail 175 (Figs. 4, 5, 6, 7, 11, 12, and 15) which extends substantially the whole width of the machine and underlies all of the levers 150 in the various denominations. One end of this bail is connected by a stud 176 (Figs. 6 and 8) which extends through a slot 177 in the left hand side plate 30, to a link 178 lying on the outer surface of the left side plate 30 and extending rearwardly to a point near the rear of the machine, where it is operated from time to time by mechanism described below under the heading "Operating mechanism". This mechanism normally holds the link 178 at the forward limit of its motion, which holds the bail 175 in its extreme counterclockwise position, illustrated in Fig. 4. In this position, the bail contacts with the tails 170 of all of the levers 150 in all denominations and holds these levers against the influence of their springs 171, in an extreme clockwise position as illustrated in Fig. 4. In this position, all of the zero stops 153 are withdrawn to an ineffective position, and the tails 170 of these levers hold all of the levers 160 in an extreme counterclockwise position, so that all of the blank stop arms 166 are likewise withdrawn to an ineffective position.

After the amount keys have been depressed to determine the amount to be written, the first part of the operation of the machine causes the link 178 to move rearwardly, which causes clockwise rotation of the bail 175 from the position shown in Figs. 4 and 6 to the position shown in Figs. 5, 11, and 12. Thus the bail no longer holds the levers 150 in their extreme clockwise positions, but these levers are released to the influence of their respective springs 171. In any denomination in which an amount key has been depressed, the lever 150 will move only a very slight amount in a counterclockwise direction, until the nose 151 comes into contact with the control lug 70 of that denomination, which will then be positioned as in Fig. 5 and which will stop the lever 150 in the position there shown, leaving the zero stop 153 of that denomination still in an ineffective position. The tail of this lever 150 holds the lever 160 of the same denomination likewise in the position shown in Fig. 5, so that the blank stop 166 of that denomination also remains in a withdrawn or ineffective position, and the lugs 162 on the levers 160 hold all of the levers 160 of lower denominations also in a position to keep the blank stops of all lower denominations withdrawn to an ineffective position, without affecting the zero stops 153 of lower denominations.

In any denomination in which no key has been depressed, however, the clockwise movement of the bail 175 allows the lever 150 to move through a substantial extent in a counterclockwise direction, from the position shown in Fig. 4 to the position shown in Figs. 11 and 12, in which it will be noted that the nose 151 passes by and is not stopped by the lug 70 of that denomination. In moving counterclockwise to its extreme position, the lever 150 projects its connected zero stop arm 153 to an effective position as shown in Figs. 11 and 12. Also, the tail 170 of the lever 150 releases the lever 160 and permits this lever 160 of the same denomination to move in a clockwise direction (if no key has been depressed in any higher denomination) to the position shown in Fig. 11, which has the effect of projecting the blank stop arm 166 of that denomination to an effective position as shown in that figure. If, however, a key has been depressed in any higher denomination, then the blank stop lever 160 of that higher denomination will be held in its counterclockwise position as in Fig. 5, and the lugs 162 will hold the blank stop levers of all lower denominations, including the denomination now under discussion, likewise in their counterclockwise positions with the result that the denomination under discussion will appear as in Fig. 12, with the blank stop arm 166 held in an ineffective position but with the zero stop arm 153 projected to an effective position. Thus, in all denominations below the highest significant digit to be printed, the blank stop arms 166 will be withdrawn and will not lie in the paths of the controller arms 110, but in any such lower denomination in which no key has been depressed, the zero stop arm 153 will be effective and will lie in the path of the controller 110, as shown in Fig. 12, so that a zero will be printed in this denomination, as it should be.

Prefix character

It is desirable to print a dollar sign ($) or other monetary designation, with or without other characters or words, immediately to the left of the highest denomination figure to be printed, in order that there may be no place left in which other figures may be inserted in an attempt to raise the value of the check or draft. Since the number of digits to be printed may vary considerably, it is obvious that the matter to be printed immediately to the left of the highest digit cannot be printed from a fixed or immovable type, because it is to be printed at different times in different positions, depending on the number of denominations or digits which are to be printed. Hence the so-called prefix is printed in the present case from a movable type which is arranged to be shifted longitudinally along the printing line to a position next to the highest denomination of digit to be printed.

The prefix character and associated mechanism are best shown in Figs. 3, 6, 9, 18, and 19, to which reference will now be made.

Extending across the machine from one side of plate 30 to the other, a little to the front of the printing line, are two rods or shafts 191 and 192, parallel to each other. Slidable along the rod 191 is a carrier 193 formed of a plate having two spaced ears 194 embracing the rod 191 with a snug sliding fit and with a forward extension 195 underlying the rod 192 to prevent rotation of the carrier about the shaft 191 in a clockwise direction when viewed as in Fig. 6.

The rear edge of the carrier plate 193 is provided with cooperating ridges and grooves extending in the direction of the printing line and arranged to receive a prefix type character 200 provided with cooperating complementary ridges and grooves and slidable longitudinally along the rear edge of the plate 193. The front edge of the prefix type character 200 has a notch 201 (Fig. 19) in which may engage a rounded nose 202 on a lever 203 pivoted at 204 to the under side of the plate 193 and provided with a spring 205 on the top of the plate 193 connected to an ear which extends up past the right hand edge of the plate as shown in Fig. 18, which tends to turn the arm 203 in a clockwise direction about its pivot 204 to hold the nose 202 in the notch 201 when the prefix character is in place on the carrier, or to turn the arm until the ear comes into contact with the edge of the plate 193 if the prefix character is removed. The lever 203 thus acts as a spring detent for holding the prefix type character 200 against longitudinal sliding movement on its carrier plate 193, but permits the prefix character to be readily removed from the plate by a slight pull exerted on a handle 208 (Fig. 18) connected to the character at its left hand end, which pull will serve to force the nose 202 of the detent out of the notch 201 and the character can then be pulled leftwardly off of the plate 193 through a sufficiently large opening 209 in the side plate 30.

The carrier 193 is provided with still another upstanding ear 210 (Figs. 6, 9, 18, and 19) to which is riveted a stud 211 which engages a slot in the lower end of an arm 212 pivoted at 213 on an adjustable eccentric bushing to a stationary bracket 214 formed on a hub 215 pinned at 216 to the shaft 86. An arm 218 (Figs. 3 and 9) integral with the arm 212 extends leftwardly from the pivot 213 to the left hand side plate 30 and passes through a slot 219 in the plate, which slot acts as a guide for the arm 218 in its movements. A spring 220 connected at its upper end to the arm 218 and at its lower end to a fixed stud on the side plate 30, pulls downwardly on the arm 218 and tends to turn the arms 212 and 218 about their pivot 213 in a counterclockwise direction when viewed as in Fig. 9, thus tending to move the carrier 193 and the prefix type 200 in a rightward direction from their extreme leftward positions shown in Fig. 9.

Slightly to the right of the left hand side plate 30 and pivoted thereto at 222 (Figs. 3 and 6) is a lever having one arm 223 extending forwardly and underlying the arm 218, and another arm 224 extending downwardly and provided with a cam follower roller 225 for operation by a cam forming part of the operating mechanism which will be described below.

The stationary hub 215 above mentioned, has a downward extension 230 (Figs. 6 and 9) having a flat lower surface immediately above the top of the prefix type member 200 when the latter is in its normal leftward position shown in Fig. 9. When pressure is exerted against the prefix type character, during a printing operation, the lower surface of the member 230 forms an abutment against which the prefix character may contact in order to withstand the upward pressure upon it.

All of the type disks 81, which lie in denominations above the units of dollars denomination, are cut away next to the zero ends of their respective type segments 82, as shown in Figs. 5 and 17, and are provided with laterally extending lugs 232 (Figs. 5, 9, and 17) which, when these type disks are in the "blank" printing position, lie in a plane immediately above the top surface of the prefix character 200 and serve as abutments for withstanding upward pressure on the type character 200 whenever the latter is positioned beneath these lugs 232. No such lugs are needed on the type disks of units of dollars denomination or lower denominations, because as already explained, a zero is always printed in this denomination when no other digit is to be printed, so that the prefix type character never occupies a position in the units of dollars denomination or in any lower denomination.

When the machine is at rest, between successive printing operations, suitable operating mechanism described below acts upon the roller 225 (Fig. 6) to hold the arm 223 in its uppermost position as shown in Fig. 6, which holds the arm 218 likewise in its uppermost position with the arm 212 in its extreme leftward position, maintaining the carrier 193 and type character 200 in their normal leftward positions shown in Figs. 9 and 18. The extreme right edges of the carrier 193 and of the type character 200 then lie just to the left of the type disk 81 of the highest denomination, as indicated in Figs. 9 and 18.

After an amount has been set up on the keys and when the machine is being operated to print the amount, one of the earliest things that takes place, soon after the type disks 81 begin to move, is that the roller 224 is released so that the arm 223 may drop downwardly, and the spring 220 then pulls the arm 218 downwardly, causing rightward movement of the arm 212 and of the prefix character 200, until the right hand end of this character comes into contact with the left hand surface of the type segment 82 of the highest denomination which has been moved from the "blank" position to print any digit. Further rightward movement of the prefix character is stopped by this contact with the highest denomination type segment, and the end of the prefix character then presses lightly against the side of the type segment, under the influence of the spring 220, during the remainder of the setting movement of the type segment if this segment has not already completed its setting movement before the prefix character contacts with it. In those denominations higher than the highest significant digit to be printed, the prefix character 200 moves, of course, through the open spaces or notches in front of the type segments, and lies immediately beneath the lugs 232 so that the latter form abutments to resist upward pressure on the prefix character during the printing operation. It is thus seen that the letters, figures, or signs which are formed on the prefix type character will be printed immediately adjacent the highest denomination digit to be printed, irrespective of the number of digits which are to be printed.

The type character 200 may carry any suitable designation or wordings, preferably being formed to read "Exactly $". The right hand edge of the character 200, when in its normal position on the carrier 193, is flush with the right hand edge of the carrier, so that both the carrier and the type character come into contact with the left hand surface of the type segment 82 at the same instant, and there is no tendency, by reason of inertia, to displace the type character 200 along the carrier.

Platen mechanism

The side plates 30 of the machine are provided with horizontal slots 245 (Figs. 4, 6, 7, and 9) extending from the front of the machine a considerable distance toward the rear and lying in a horizontal plane just beneath the effective printing surfaces of the members 82, 130, 134, and 200. The check, draft, or other instrument to be printed is placed in these slots so that it underlies the printing types in known manner, and a platen then rises up from beneath the check or draft to press it firmly against the printing types (or rather against an inking ribbon interposed between the check and the types, in the present preferred construction) in order to print the desired characters on the check or other instrument. This platen and its associated mechanism are best shown in Figs. 4 and 5, to which reference will now be made.

The machine is provided with a main operating shaft 250 journaled for rotation in the side frame plates 30. This shaft extends through the right hand side plate and is provided with any suitable means for turning it. For example, if the machine is to be hand operated, the right hand end of the shaft may be provided with an operating lever 251. This shaft and lever will be referred to again below in the description of the operating mechanism. For the purpose of describing the platen mechanism, it is sufficient at present to state merely that two crank arms 252 are securely fixed to the shaft 250 at opposite sides of the machine. Each of these arms has pivoted to it at 253 the upper end of a link 254 the lower end of which has a long slot 255 which embraces an end of a cross shaft 256 secured in the rear ends of a pair of arms 257 joined to each other by a strengthening web 258 and pivotally mounted near their forward ends on a shaft 259 which is secured in the side frame plates 30 and 280. The lever arms 257 extend slightly forwardly beyond the shaft 259 and have at their forward ends pivot pins 260 which extend through downwardly extending ears on a platen carrier 261. This platen carrier has a platen 262 held therein by suitable adjusting screws 263.

An ear 265 at the left hand end of the platen carrier 261 has pivoted to it the rear end of a link 266 the front end of which is pivoted at 267 to the rear end of another link 268 the front end of which is mounted for rotation on a cross shaft 269. The link 268 is of somewhat elbow shape and is provided with a stud 270 projecting from its left hand side through a slot 271 formed in the left hand side plate 600. Contact of the stud 270 with an edge of the slot as shown in full lines in Figs. 4 and 5, limits movement of the link 268 in a counterclockwise direction about its shaft 269, the link normally being held in this position by a spring 272 connected at one end to the stud 270 and at the other end to a suitable fixed point. A finger piece 273 is formed at a convenient point on the link 268.

When the main operating shaft 250 is turned to operate the machine, the links 254 are forced downwardly. Because of the long slots 255, the shaft 256 is not operated at first, but near the latter part of the downward movement of the arms 254, the upper ends of the slots 255 come into contact with the shaft 256 and begin to force the shaft 256 downwardly. At about this time the pivot 253 is almost in a direct line between the shaft 250 and the shaft 256, so that the parts act as a toggle and very great force can be applied in a downward direction to the shaft 256 by comparatively slight force upon the operating lever 251.

The downward movement of the shaft 256 causes the arms 257 to swing about their pivot shaft 259 and raises the pivots 260 at the forward ends of these arms. This raises the platen carrier 261 and the platen 262 carried thereby, the links 266 and 268 holding the platen carrier in an upright position over the pivots 260 so that the platen 262 will be properly alined with the printing types which have been set to the printing line. The check or other document interposed between the platen and the printing types is thus imprinted, and preferably both the platen and the printing types have serrated surfaces so that the paper is mashed and crimped or embossed at the same time that printing takes place, in order to render alteration of the instrument more difficult.

If it is desired to obtain access to the platen for cleaning or for inspection, the machine is turned on its side or back in order to obtain access to the bottom of the machine, and after the bottom casing plate has been removed, the finger piece 273 is pulled in a downward direction when viewed as in Figs. 4 and 5. This stretches the spring 272 and moves the link 268 to the position shown in dotted lines in Fig. 4, shifting the pivot 267 downwardly and forwardly to pull forwardly on the link 266. This, in turn, pulls forwardly on the upper edge of the platen carrier 261 and thus turns the platen carrier about its pivots 260 to the dotted line position of Fig. 4, in which the normal printing edge of the platen is turned down to be readily accessible, as seen in Fig. 4.

A spring 275 secured at its rear end to any suitable fixed point and at its front end to a stud 276 depending from the web 258, serves to return the platen when the links 254 move upwardly again, and to hold the platen normally in the position shown in Fig. 4, when the machine is idle.

To reinforce the side plates 30 of the machine and particularly to withstand the stress of the great upward pressure of the platen on the type, the machine is provided with a pair of reinforcing plates 280, one lying on the outer surface of each of the side frame plates 30, as shown, for example, in Fig. 3 and 8 to 10, inclusive. These plates are heavy plates extending around the rear edges of the slots 245, and extending downwardly and forwardly from the rear edges of these slots far enough to form bearings for the shaft 259, and upwardly and forwardly as shown in Figs. 6 and 7, far enough to provide a bearing for the main operating shaft 250 and the type shaft 86. Thus these plates 280 form a reinforcement helping to hold the pivots 86 and 259 in fixed position relatively to each other in spite of the great pressure exerted between them.

*Operating mechanism*

The mechanism for operating the various individual parts of the machine above described will now be explained with special reference to Figs. 3 to 7, inclusive, and 10 and 16.

It will be recalled that the shaft 250 is the main operating shaft of the machine and has fixed to it the crank handle 251 if the machine is to be operated by hand.

Near each end of the shaft 250, just within each side wall 30, is a disk 300 fixed rigidly to the shaft and having the shape best shown in Figs. 6, 7, and 16. Each disk 300 has a sharp corner or shoulder 301 approximately at the highest point of the disk when it is in its normal idle position of rest shown in Figs. 6 and 7, and has a smooth cam surface 302 concentric with the shaft 250, extending around for a considerable distance rearwardly from the shoulder 301.

Slightly above the disks 300 is a shaft 305 extending across the machine from one side plate 30 to the other. This shaft carries a key locking bail 306 extending substantially the full width of the keyboard and mounted to turn freely on the shaft. Each denominational unit of the keyboard is provided near its rear end with a lever 307 (Figs. 5 and 6) pivoted at 308 to the plate 35 and having a forked upper end engaging a pin 309 on the key locking bar 50. The lower end of the lever 307 is in position to be engaged by the bail 306 as the latter swings about the shaft 305.

The left hand end of the bail 306 has fixed to it an arm 315 having a hook-shaped end 316, as shown in Figs. 5 and 6. The right hand end of the bail 306 has no such arm, but mounted to rotate freely on the shaft 305 near the right hand end of the bail, is a somewhat similar arm 317 having a similar hook-shaped end 318 and having an extension 319 lying underneath the bail 306, as plainly shown in Figs. 7 and 16. A spring 320 (Fig. 7) connected at one end to the bail and at the other end to the arm 317 tends to keep the bail in contact with the portion 319.

The hooked ends 316 and 318 of the respective arms 315 and 317 lie in the planes of the disks 300 and slightly in advance of the corners 301 on these disks, as shown in Figs. 6 and 7. When it is attempted to turn the disks 301 forwardly, in a clockwise direction, when viewed as in Fig. 7, or a counterclockwise direction, when viewed as in Fig. 6, then the corners 301 after moving through a short distance will engage the hooked ends 316 and 318 unless these ends have meanwhile been moved out of the path of the disk 300, and will prevent further forward movement of the disks.

The arm 317 has fixed to it another arm 325 (Fig. 7) which, when in normal idle position, engages a pin 326 on the right hand disk 300. A spring 327 tends to turn the arms 317 and 325 in a counterclockwise direction about the shaft 305, but such movement is prevented by contact of the end of the arm 325 with the pin 326, when the parts are in the normal idle position shown in Fig. 7.

As the operating handle 251 is pulled forward to produce a printing operation, it turns the disks 300 forwardly (in a clockwise direction when viewed as in Fig. 7) and almost immediately the pin 326 rides out from under the arm 325, allowing the spring 327 to turn the arm in a counterclockwise direction. This throws the bail upwardly against the depending ends of the levers 307 of each keyboard unit. In this position, the hooked ends 316 and 318 of the arms 315 and 317 are lifted up out of the paths of the corners 301 on the disks 300, so that the disks may continue rotation as movement of the handle 251 is continued. As soon as the corners 301 of the disks pass under the ends 316 and 318, these ends then ride on or close to the concentric surfaces 302 on the disks, which surfaces prevent the ends 316 and 318 from being depressed. In this manner, the keys are all locked in the positions to which they are set, for the bail 306 holds all of the locking bars 50 in their forward positions, and the cam surfaces 57 on the key stems prevent any key from being depressed.

It is also seen that if in some way a key should become stuck in a partially depressed position as shown in Fig. 6, this will prevent operation of the machine through the interlocking mechanism above described. If any key should remain depressed part way but not sufficiently for the lug 51 to snap over the shoulder 55 on the key, then the locking bar 50 would be held somewhat rearwardly of its normal position, with the result that the lower end of the lever 307 connected to that locking bar would be held somewhat forwardly of its normal position of rest. This would prevent the full swing of the bail 306 through its intended travel, and when the pin 326 slides out from under the arm 325, the bail would come into contact with the misplaced arm 307, which would hold the ends 316 and 318 of the arms 315 and 317 in the path of the corners 301 on the disks 300, so that the corners would catch on the hook-shaped ends of the arms and the handle 251 could not be operated more than a slight initial amount. This would warn the operator that something was wrong and investigation could be made to correct the abnormality.

Pivoted on the inner surface of the left hand side plate 30 at 330 (Fig. 6) is a lever having a lower end 331 in the plane of the disk 300 to be engaged thereby, and an upper end 332 pivotally connected at 333 to the rear end of the link 178 which controls the bail 175 of the zero stop and blank stop mechanism. Substantially at the beginning of the rotation of the main shaft 250, the lower rear corner of the left hand disk 300 leaves the arm 331 and allows this arm to turn in a clockwise direction about this pivot 330 from the position shown in Fig. 6 to the position shown in Fig. 5. Thus the link 178 is permitted to move rearwardly under the influence of a suitable spring connected to it, and of the springs 171 of the zero stop and blank stop mechanism; and this in turn permits the zero stop arms 160 to move in the manner previously described.

With the keys now locked against accidental movement, and with the zero stops and blank stops set in proper position, the type elements may now be rotated to set them in proper position for printing. This is accomplished by the means best shown in Figs. 4, 7, and 16. Near the right hand side of the machine, the main shaft 250 has fixed to it a cam 340 shaped as shown in the drawings and having a surface 341 for engaging a follower roller 342 (Figs. 4 and 7) on a lever 343 pivoted to turn on the shaft 125. The lever 343 is pivoted at 344 to a link 345 the other end of which is pivoted at 346 to the gear segment 115. The relative positions of the pivots 344 and 346 are such that, as shown in Fig. 4, the pivot 344 lies slightly rearwardly of a straight line drawn from the pivot 346 to the shaft 125, when the parts are in normal idle position.

As the handle 251 is pulled forwardly to rotate the shaft 250 in a clockwise direction when viewed as in Fig. 7, the follower roller 342 in contact with the cam surface 341 is forced in an upward and forward direction, turning the lever 343 in a counterclockwise direction when viewed as in Fig. 7, or in a clockwise direction when viewed as in Fig. 4, about its shaft 125. Because of the above mentioned relationship of the pivot 344, this rotation of the lever 343 first pushes down slightly on the link 345, which moves the gear teeth on the segment 115 slightly upwardly and, through the gear teeth 114, moves the bail 113 slightly downwardly. As movement of the lever 343 is continued, the pivot 344 passes its dead center position and pulls upwardly on the link 345, moving the gear teeth on the segment 115 downwardly and, through the gear teeth 114, swinging the bail 113 upwardly and rearwardly to set the type disks in accordance with the numbers set up on the keyboard, as previously explained. The slight movement of the bail in reverse direction at the beginning of the movement of the shaft 250, allows time for the zero stop and blank stop mechanism to operate properly before the controller arms 110 begin to move upwardly, so that the blank stops and zero stops will be properly positioned before the arms 110 arrive at the stops.

As the shaft 250 turns, a cam 350 (Fig. 6) fixed to the shaft near the left side of the machine runs along past the follower roller 225 fixed to the arm 224 which controls the prefix character movement. This cam 350 is so shaped and placed on the shaft 250 that shortly after the bail 113 begins to move upwardly, the cam allows the follower roller 245 to move rearwardly and the spring 220 can then shift the movable prefix character rightwardly until it comes into contact with the type segment of highest denomination which is being moved from the blank position to any printing position.

During this movement of the main shaft 250, the crank arms 252 thereon have been moving the links 254 downwardly. Finally the upper ends of the slots 255 in the links 254 come into contact with the shaft 256 and operate the platen to perform the actual printing operation in the manner previously described under the heading "Platen mechanism".

Fixed to the shaft 250 at a point intermediate its ends is an arm 360 (Fig. 6) having ratchet teeth 361 cut in a peripheral portion concentric with the shaft. These teeth 361 are in the plane of and are arranged to be engaged by a full stroke pawl 362 of any conventional construction, pivoted at 363 to an extension on the stationary hub 215, and controlled by a spring 364 in known manner. This full stroke mechanism is not effective during the first part of the operation of the handle 251 and the handle can be returned to initial position even after considerable movement has taken place. During the latter part of its movement, however, the full stroke pawl engages the teeth 361 and prevents the handle from being returned until it has been pulled fully forwardly and downwardly to the limit of its motion. This insures a proper heavy imprint on the check and prevents the operator from accidentally imprinting the check too lightly by failing to move the handle quite to the end of its intended movement.

After printing has taken place, the handle 251 is returned by moving it upwardly and rearwardly, which turns the main shaft 250 back in a clockwise direction, when viewed as in Fig. 4, or in a counterclockwise direction when viewed as in Fig. 7. This returns all of the parts to their normal idle positions through a reverse process. In addition, it normally releases all of the denomination keys of the keyboard so that their springs 56 force them back to elevated or unset position.

In order to release the keys, there is provided a clearing bail 370 (Figs. 5, 6, and 7) mounted for rotation on the same shaft 305 with the locking bail 306, and lying to the rear of the levers 307. An arm 371 is pivoted to the left hand end of the bail 370 at 372 and extends rearwardly, close to the left hand side plate 30, its rear end resting on and being supported by a pin 373 on an upstanding arm 374 mounted for rotation on the shaft 125. The arm 374 extends downwardly below the shaft 125 and at its lower end is a stud 375 on which is pivotally mounted a pawl 376, the front end of which lies in the plane of and in position to be contacted by a pin 377 extending rightwardly from the left hand disk 300, as shown in Fig. 6. A spring 378 tends to turn the pawl 376 in a counterclockwise direction about its pivot 375, until a part of the pawl comes into contact with and is stopped by the pin 379 on the arm 374.

As the operating handle 251 is pulled forwardly to move the shaft 250 in a counterclockwise direction when viewed as in Fig. 6, the pin 377 on the disk 300 comes into contact with the lower side of the pawl 376 and turns this pawl against the tension of its spring 378. The pawl snaps back to initial position after the pin 377 has passed it, and no movement of the arm 374 takes place.

During the reverse movement, however, when the handle 251 is being returned for the printing operation, the pin 377 engages the top of the pawl 376, and tends to turn it in a counterclockwise direction about its pivot 375, but the pawl can not turn at this time because of its engagement with the stop pin 379. Hence the pin 377 forces the entire arm 374 in a counterclockwise direction about the shaft 125, and the pin 373 on the arm 374 rides along the under surface of the arm 371 until it comes into contact with a shoulder 380 formed on this lower surface, after which the pin 373 shoves the arm 371 leftwardly or toward the front of the machine, swinging the clearing bail 370 toward the front and moving the bottom ends of all of the levers 307 frontwardly. This shifts the upper ends of all of the levers 307 rearwardly, moving all of the locking bars 50 rearwardly and releasing all of the keys which may have been depressed, allowing all of them to spring up to their normal uppermost positions, under the influence of their respective springs 56.

Pins 385 (Figs. 3 and 6) on the side plates 30 act as stops limiting both the forward and rearward or return movement of the disks 300 and thus determine the normal rearward position of the handle 251.

Repeat mechanism

Sometimes it is desirable to print the same amount more than once in succession. For example, it may be desired to make out a number of checks all for the same amount, or it may be desired to print the same amount more than once on each check. Repeat mechanism is provided in the present machine to enable this to be done as many times as desired without having to set the keys anew for each printing operation.

At the left hand side of the machine just to the rear of the regular denominational keys is an accessible bar 390 (Figs. 1 and 10) bearing a suitable legend such as the word "Repeat". It is fixed to the top of a bail 391 having two arms which extend downwardly through suitable slots in the top casing and in the angle iron 32 and which are pivoted at their lower ends to a bail 392 (Figs. 5 and 6) rotatably mounted on the shaft 393 and influenced by a spring 394 which tends to turn this bail 392 in a clockwise direction (when viewed as in Fig. 6) about the shaft and to raise the bail 391 and control bar 390. The left hand end of the bail 392 has a depending forked arm, one portion 396 of which is provided with a pin 397 projecting laterally into the plane of the arm 371 and underlying this arm. The other fork 398 lies near and in the plane of a pin 399 on an arm 400 integral with the arm 315 of the locking bail 306.

When the control bar 390 is depressed it may be moved slightly rearwardly until shoulders 401 on the vertical legs of the bail 391 engage under a suitable plate or ledge 77 in order to hold the bar and bail depressed. The depression of the bar 390 swings the bail 392 in a counterclockwise direction about the shaft 393, which throws the pin 397 rearwardly and upwardly until it engages the arm 371 and lifts the arm sufficiently so that the pin 373 will no longer engage the shoulder 380. Thus the clearing mechanism is rendered inoperative and, although the arm 374 will swing in the normal manner during return movement of the operating handle, yet it will not operate the clearing bail 370 and the keyboard will not be cleared.

At the same time, the arm 398 on the bail 392 is swung rearwardly to overlie the pin 399 on the arm 400 connected to the locking bail 306, which positively holds this pin in a low position and maintains the locking bail 306 in its rearward position which holds the keyboard locked. Operation of the machine can then be continued as many times as desired, and each time the machine will print the same amount, without further attention to the keyboard. When a different amount is to be printed, the repeat bar 390 is pulled slightly forwardly, which releases the notches 401, permits the springs 394 to return the bail 392 to its normal position shown in Fig. 6, and once more releases the pin 399 of the locking bail 306, and replaces the arm 371 of the clearing mechanism in position so that the keyboard will be cleared after each operation of the machine.

Clearing key

Some times the operator makes a mistake and depresses the wrong keys. As previously explained, the depression of a second key in the same bank or denomination of keys will result in releasing a previously depressed key in that denomination, but nevertheless it is desired to have a clearing key by which all keys of the keyboard can be released and returned to unset position when desired.

Accordingly, there is a clearing bar 410 (Figs. 1, 9, and 10) having a suitable legend such as the word "Clear", which bar is fixed to a bail 411 which may be similar in general to the bail 391 of the repeat key 390. Vertical arms of the bail 411 extend downwardly as shown particularly in Fig. 7 and are pivotally connected to arms carried by opposite ends of the bail 412 on the shaft 393, the left hand end of which bail also has an arm 413 pivoted at 414 to a link 415 having a slot 416 embracing a pin 417 on one end plate 418 of the clearing bail 370. A spring 419 connected to the link 415 pulls downwardly on the arm 413 and thus resiliently holds the clearing bar 410 in its uppermost position. Another spring 420 pulls rearwardly on the end plate 418 of the clearing bail 370.

If the clearing bar 410 be depressed, this will swing the bail 412, pull upwardly on the link 415, and raise the pin 417, which will swing the bail 370 in a clockwise direction about the shaft 305 when viewed as in Fig. 7. The bail 370 will thus push forwardly on all of the levers 307, moving the locking bars 50 of all denominations in a rearward direction, and releasing all of the keys, just as in the case of the operation of the clearing bail 370 through the regular clearing mechanism shown in Fig. 6. When the bail is operated through the regular clearing mechanism, however, this does not affect the clearing key 410, for during such operation the pin 417 merely rises in the slot 416 without moving the clearing key.

Ribbon mechanism

The machine is equipped with suitable ink providing means so that the printing types will make an inked impression on the paper. This may be done, of course, either by inking the types themselves or by interposing an inked ribbon between the types and the paper. The use of an inking ribbon is preferred in the present instance, and this ribbon with its associated holding and feeding mechanism will now be described with special reference to Figs. 3, 4, 6, 7, and 16.

At the front of the machine, slightly above the slot 245 which receives the paper to be printed upon, is a ribbon supply spool 450 having at its end trunnions 451 which are slidable in horizontal slots in brackets 452 fixed to the inner sides of the side frame plates 30. This supply spool is readily removable by pulling it straight out horizontally toward the front of the machine, with the trunnions 451 sliding out through the front open ends of the slots in the brackets 452.

A pair of levers 454, one pivoted on the inner surface of each side plate 30 at 455, have laterally extending ears 456 for engaging the rear sides of the end flanges of the spool 450, as best shown in Figs. 6 and 15. Springs 457 pull forwardly on the bottom ends of the levers 454 and thus constantly push upwardly on the ribbon spool, tending to shove it out of the slots in the brackets 452, and creating a frictional drag on the spool to prevent too free rotation thereof.

The ribbon spool is held in its rearward position by latching means best shown in Figs. 6, 7, 8, and 16. On the inner surface of each side plate 30, in a plane between the bracket 452 and the plate 30, is a latch member 460 pivoted at 461 and having an end extending downwardly and rearwardly from its pivot to engage the trunnion 451 and hold the latter at the rear end of the slot in the bracket 452, notwithstanding the pressure of the lever 454 which tends to move the trunnion forwardly. This latch is so shaped at its end engaging the trunnion 451 that it cannot move downwardly but can move upwardly to disengage the trunnion and permit the trunnion to move forwardly along the bracket 452. The latch is operated by an operating lever 463 pivoted at 464 to the bracket 452 and having an ear or tab 465 accessible at the front of the machine so that it may be readily moved by a person's finger. When the operating lever 463 and its tab 465 are in the normal locked position shown in the drawings, the lower rear end of the lever 463 is in engagement with a portion of the latching lever 460 to the rear of the pivot 461, and holds this latching lever in latching position so that the trunnions 451 of the ribbon spool cannot move forwardly though they are free to rotate. If the ears 465 be swung up, however, about the pivots 464, then the ends of the levers 463 are disengaged from the parts of the latching levers 460 to the rear of the pivots 461, and come into contact with noses 466 formed one on each latching lever 460 in front of its pivot 461, engaging these noses to swing the front ends downwardly and the rear ends of the latches 460 upwardly to disengage the latches from the trunnions. The springs 457 acting through the levers 454 and ears 456 then shove the ribbon supply spool a short distance forwardly to the position where it can be readily grasped and pulled forwardly out of the slots in the brackets 452. In this way, the ribbon spool can be removed and replaced by another spool containing a fresh supply of ribbon.

From this ribbon supply spool, the ribbon is led as at 470 downwardly and rearwardly past a guide 471 (Figs. 4 and 6), beneath the type segments and prefix character, over a plate 472 supported by ears mounted for rotation on a shaft 473, around a guide roller 475 near the back of the machine, and up to a winding spool 476.

The winding spool and its associated parts can best be seen in Figs. 4, 6, 7, and 10. At the rear of the machine, on the inner surface of each side plate 30, is a mounting plate 480, and all of the winding mechanism is mounted on these two mounting plates at opposite sides of the machine, so that the entire winding mechanism can be readily removed as a unit merely by loosening and removing the two plates 480 without having to disassemble the entire mechanism piece by piece. The trunnions at the ends of the spool 476 are mounted on suitable bearings on the plates 480.

At the left hand side of the machine, between the end of the spool 476 and the adjacent mounting plate 480, is a spring member 481 of spiderlike form which tends to press the spool toward the right hand end of the machine and thus produces friction on it to prevent it from turning too freely if the pawl and ratchet mechanism is thrown out as mentioned below. At the opposite or right hand side of the machine, ratchet teeth 483 are secured to the end flange of the spool 476 and are arranged to be engaged by a tooth 484 (see Fig. 7) on one end of a winding pawl 485 pivoted at 486 to a carrier 487 which is mounted for rotation about an axis in alinement with the axis of the spool 476. A spring 488 attached at one end to the pawl 485 and at the other end to an arm on the carrier 487 tends to keep the tooth 484 on the pawl in engagement with the ratchet teeth 483 on the spool. The carrier 487 has another arm extending upwardly at 490 and having a forked upper end which is engaged by a pin 491 on the operating member 343 which, it will be remembered, is swung back and forth each time that the handle 251 is operated.

As the member 343 swings during the early part of each operating movement, the pin 491 moves forwardly, causes the arm 490 to move forwardly or rotate in a clockwise direction about the axis of the spool, when viewed as in Fig. 7, and moves the pawl 485 clockwise around the spool, giving a corresponding rotary movement to the ratchet teeth 483 and the spool 476. This winds up a portion of the ribbon on the spool 476, unwinding it from the front spool and bringing a fresh portion of ribbon to the printing line. The ears 456 on the levers 454 pressing against the flanges of the supply spool 450, provide sufficient friction on the supply spool so that it does not unwind too freely, but turns only in accordance with a pull on the ribbon produced by the feeding pawl 485.

In order to hold the rewinding spool 476 against reverse rotation when the operating member 343 moves the member 490 back at the end of the operation, there is a second pawl 495 (Fig. 7) pivoted at 496 to the mounting plate 480 and having a forward end engaging the ratchet teeth 483 to prevent retrograde motion thereof. A spring 497 pulls on the pawl 495 in a direction to hold it in engagement with the ratchet teeth.

It is desirable to provide an arrangement for throwing out the pawls 485 and 495 when desired, in order that the ribbon may be unwound from the rear spool 476 and rewound on the front spool 450. This may be done from time to time for the sake of economy, so that the same ribbon may be used over again two or more times without having to replace it with a new ribbon when it has made only a single traverse through the machine. To this end, a lever 500 is pivoted to the upper end of the right hand mounting plate 480 at 501 and has a downwardly depending arm provided with a notch 502 which may at times engage a pin 503 extending laterally from a rearwardly extending portion of the pawl 495. The same spring 497 which is connected to the pawl 495 is also connected at its other end to the lever 500 in such a manner as to tend to turn this lever in a clockwise direction (when viewed as in Fig. 7) about its pivot 501 and to press the rear edge of the lever against the front side of the pin 503. Normally the pin 503 is slightly above the notch 502 and is not affected thereby. The pawl 495 has an ear 505, however, which is conveniently accessible and may be depressed to turn the pawl against the action of the spring 497 until the pin 503 snaps into the notch 502, after which the notch will hold the pawl in this depressed position, with its effective end moved up out of contact with the ratchet teeth 483.

The pawl 495 also has a rearwardly and downwardly extending arm 506 the front lower surface of which forms an inclined cam surface for engagement with an ear 507 on the upper end of the feeding pawl 485. When the pawl 495 is thrown out by a downward movement of its ear 505, the arm 506 shifts the feeding pawl 485 to remove the teeth 484 from the ratchet teeth 483, and both pawls are held out of engagement with the teeth by means of the pin 503 being engaged with the notch 502. When it is desired to reengage the pawls to make the ribbon feeding mechanism once more effective, that can be readily done by a rearward movement of the upper end of the lever 500, which moves the notch 502 out of alinement with the pin 503, allows the spring 497 to return the pawl 495 to normal engaged position, and releases the pawl 485 so that the spring 488 may return it to normal engaged position.

In order that serious consequences may not result from the inadvertent neglect of the operator to move the pawls back to an effective position after rewinding the ribbon on the front spool, an arrangement is provided for doing this automatically. A pin 510 (Figs. 4, 7, and 10) is fixed to the end of an upwardly extending arm on the operating member 343, and to this pin is fixed the rear end of a spring 511 (Fig. 4) which pulls forwardly in order to assist in returning the parts to normal idle position after each operation. This same pin 510, however, is so placed that when it moves rearwardly during the early part of an operation of the machine, it will strike the upper end of the lever 500 if the latter has been left in the thrown-out position, and shift this lever to release the pin 503 from the notch 502 and thus to render the ribbon feeding mechanism once more effective.

Figure 2:
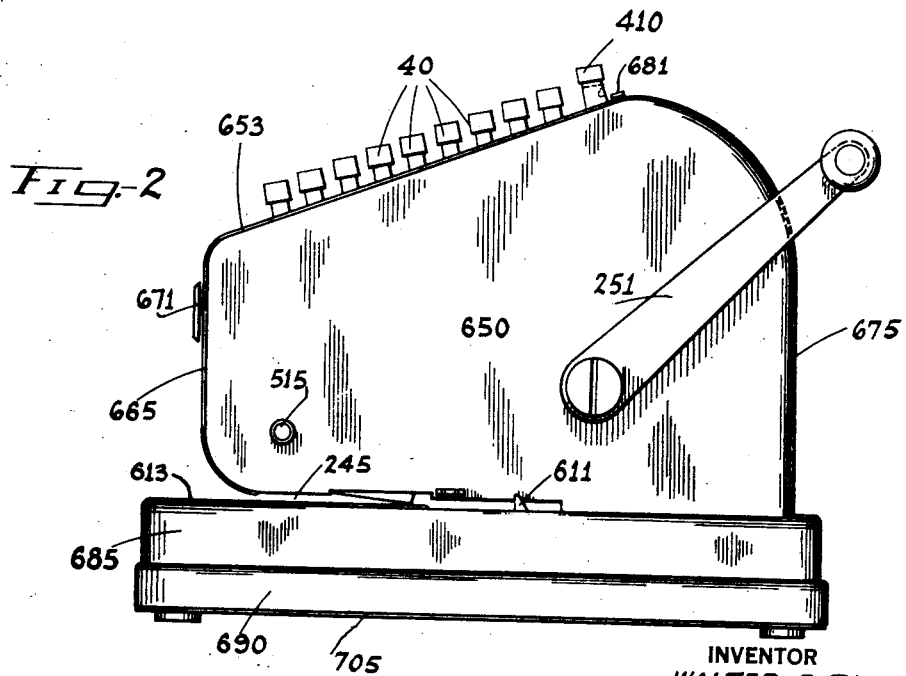
Fig. 2 is a side elevation thereof.

When the pawls have been thrown out as above described, the ribbon may be readily rewound onto the front spool 450 in any suitable manner, as for example by means of a known form of crank inserted through a suitable bushing 515 (Figs. 2, 3, and 4) at the right hand side of the machine in alinement with the axis of the spool 450, and having an end for engaging clutch teeth 516 (Figs. 3 and 8) formed on the right hand trunnion 451 of the supply spool 450.

It is desirable to provide some form of interlock for preventing operation of the machine when there is no ribbon. Such interlocking mechanism is illustrated in Figs. 7 and 16, to which reference will now be made. Each ribbon supply spool 450 is provided near its left hand end with a circumferential slot 520 formed in the core or barrel of the spool, which is hollow. An arm 521 pivoted at 522 to the inner side of the right hand side plate 30, has a lower end 523 in the vertical plane of the slot 520. A spring 524 secured to the arm 521 tends to move the lower end of this arm forwardly, so that so long as the ribbon spool is in proper position and has one or more convolutions of ribbon thereon, the lower end 523 presses lightly against the ribbon on the spool. When the last convolution of ribbon has been unwound from the core of the spool, as illustrated in Fig. 16, then the end 523 moves farther forwardly and enters the slot 520 as shown in that figure.

This forward movement of the end 523 moves a pin 526 on the arm 521 into a notch 527 on an arm 528 pivoted at 529 to the outer or right hand surface of the right hand side plate 30, the pin 526 extending through a suitable notch 530 in this side plate 30.

The entry of the pin 526 into the notch 527 throws the arm 528 downwardly from the position shown in Fig. 7 to the position shown in Fig. 16, so that a link 532 pivoted at 533 to an upstanding extension on the arm 528 is moved rearwardly and a pin 535 extending through a notch 536 in the side plate 30 is moved upwardly and rearwardly along the notch, from the position shown in Fig. 7 to the position shown in Fig. 16. In this latter position, the pin 535 overlies the end of the dog 317 and keeps this dog from turning to a position in which the nose 318 is out of alinement with the disk 300. Thus when it is attempted to operate the machine, only a slight movement of the handle can take place until the corner 301 on the disk 300 comes into contact with the nose 318 and stops further movement. The operator then knows that something is wrong and can take steps to remedy the matter.

It will be seen that this interlock operates not only when the last convolution of ribbon is unwound from the spool, but also if the spool itself be removed bodily from the machine in the manner above described, because in that event the arm 323 is allowed to move forwardly to its maximum forward position, which operates the interlock. So long as the end 523 is in engagement with one or more convolutions of ribbon, however, it is held sufficiently rearwardly so that the pin 526 does not enter the notch 527 and the pin 535 is then held in the position shown in Fig. 7, in which it does not interfere with normal movement of the arm 317.

*Payee crimping mechanism*

Users of machines such as these frequently desire to mascerate or crimp the paper where the name of the payee of the check or draft is written, in order to make it more difficult to alter the name of the payee. The mechanism for doing this may be referred to conveniently as payee crimping mechanism, and such mechanism is provided in the present machine. It will now be described with reference particularly to Figs. 4, 6, and 10 of the drawings.

The plate 472 above mentioned as a guide for the ribbon is normally held by a spring 550 which tends to pull the plate upwardly about the shaft 473 as a pivot, into engagement with suitable abutment means which prevents further upward movement. The plate may be depressed when desired for ease of threading the ribbon above it, but when released the spring will bring it back to its uppermost position. The arrangement of the ribbon for advancement between the members of the printing couple and to one side or independently of the crimping couple is substantially as disclosed and claimed in the copending application of Walter B. Payne, Serial No. 603,828, filed April 7, 1932, for Printing apparatus.

On the lower surface of this plate in a line extending across the machine slightly to the rear of the printing line, there are teeth or other suitable roughened surfaces 551 spaced from the printing line through a distance corresponding to the usual interval between the payee line and the amount line of a check. These cooperate with complemental teeth or roughened surfaces formed on the upper edge of a crimping platen 552 mounted on a plate 553 secured to arms 554 which are rotatably mounted on a cross shaft 555 in the base of the machine. If the platen 552 be moved upwardly, it will engage the bottom side of the check or draft and, in cooperation with the crimping surface 551 on the plate 472, which lies above the check or draft, will crimp or mascerate a substantial area of the check along the line where the payee's name is written.

For operating this crimping platen 552 when desired, there is provided a plate 558 having a strong upstanding flange 559 at its front edge, this plate being mounted on a pair of arms 560 pivoted at 561 at their rear ends to upstanding arms of a bail 562 mounted for oscillation on a cross shaft 563. The front ends of the arms 560 rest loosely on the top of the shaft 259 and are supported thereby. When the arms 560 and plate 553 are in their normal rearward positions of rest, shown in Fig. 4, they are ineffective and simply maintain the crimping platen 552 in the position shown.

If, however, the bail 562 be rotated in a forward direction or counterclockwise direction when viewed as in Figs. 4 and 6, then the arms 560 are moved forwardly, and this moves the heavy upstanding flange 559 on the plate 553 into position over a shoulder 565 near the rear edge of the platen holder 261 which supports the printing platen 262. The stiff flange 559 is thus interposed between the printing platen holder 261 and the plate 553, in the manner illustrated in Fig. 6. In this position of the parts, if the operating handle of the machine be pulled forwardly, the upward movement of the platen holder 261 will shove the flange 559 upwardly and it will force the plate 553 upwardly and with it the crimping platen 552, so that the check or draft will be crimped on the payee line.

It is desirable to perform the printing of the amount and the crimping of the payee line in separate operations, as otherwise the area of platen in contact with paper would be much greater and would result in less pressure per unit of area with less satisfactory crimping of the paper. Consequently, when the platen mechanism is operated to crimp the payee line, the parts are arranged so that the crimping platen 552 reaches the upper extreme limit of its motion before the printing platen 262 reaches its normal printing position, with the result that even if the amount is set up on the type segments, at the time that the payee line is to be crimped, nothing is printed during the payee crimping operation.

Fixed to the bail 562 to move therewith is an arm 568 which, when the bail is moved forwardly to render the payee crimping platen effective, is positioned beneath the shaft 256 in the position shown in Fig. 6. This arm 568 acts as a stop to limit movement of the shaft 256 which is thus prevented from moving downwardly any farther than necessary to effect proper crimping of the payee line. This stopping of the shaft 256 likewise, through the links 254, stops rotation of the main shaft 250 and prevents the handle from being pulled through its full extent of movement. The point at which the shaft 256 comes into contact with the arm 568 is preferably a point just before the full stroke pawl 362 would engage the teeth 361 with which it cooperates; consequently the full stroke mechanism is not effective up to this point, and the handle may be returned from this intermediate or payee crimping position, without having to complete its full range of movement in a forward direction.

Any suitable mechanism is provided for throwing the bail 562 forwardly to render the payee crimping mechanism effective when desired. For example, the bail 562 may be rigidly connected to a second bail 570 (Fig. 10) mounted for rotation on the same shaft 563 and extending from the left hand end of the bail 562 substantially to the left hand side plate 30 of the machine. This bail 570 has a rearwardly extending arm 571 (Figs. 4 and 6) having a pin 572 extending leftwardly therefrom through a notch 573 in the left hand side plate 600, to a position to the left of this side plate, where it is connected to one arm of a lever 574 (Figs. 6 and 10) another arm of which is pivotally connected at 575 to a stem 576 of a key or bar 577 accessible exteriorly of the machine and bearing a suitable legend such as the word "Crimp" or the word "Payee". When the key 577 is depressed, the arm 574 is swung, and this swings the bail 570 which swings the bail 562 and moves the flange 559 into operative position interposed between the carrier 260 and the plate 553, so that when the carrier is elevated it will lift the plate and cause crimping of the payee line.

*Paper guides*

Means is provided in the present machine for guiding the paper in such manner that the rear edges of the paper will be parallel with the printing line, although the rear edges may be spaced more or less from the printing line depending on the dimensions of the check or draft to be printed. This paper guiding mechanism is best shown in Figs. 7 to 9 inclusive.

Plates 600 are fixed to the lower ends of the side plates 30 and extend forwardly therefrom to form side frames for a suitable base of the machine. Mounted on the outer surface of each of these plates 600 is a rack bar 601 held in a guide formed by a plate 602 beneath and of the same thickness as the rack bar, and another plate 603 on the outer side of the plate 602 and projecting upwardly above the top of the plate 602 so as to overlie the side of the rack bar 601 and hold it against the side of the plate 600. Each rack bar has teeth along its upper edge for engaging a pinion 605 fixed to a shaft 606 extending across the machine and through suitable openings in the side plates 600. Pivoted to the rear end of each rack bar at 610 is a paper guide dog 611 projecting upwardly through a slot 612 in the horizontal plate 613 which forms part of the paper supporting surface. A spring 614 connected at one end to a tail on the guide dog 611 and at the other end to a pin on the rack bar, tends to throw the dog upwardly and presses a pin 615 on the dog against the under side of the plate 613.

This arrangement provides a parallel motion device for the two guide dogs 611, one of which is located at each side of the machine, as shown in Fig. 9. The two dogs always remain exactly opposite each other and when they are moved closer to or farther away from the printing line in order to accommodate check forms of different size, one dog will always move through exactly the same amount as the other, because they are connected to each other through the pinions 605 on the shaft 606. The friction of the pinion teeth engaging the rack bars, together with the friction of the pins 615 pressing against the bottom surfaces of the plate 613, provides sufficient resistance to movement so that the guide dogs will not be shifted accidentally by contact with paper, but they may nevertheless be shifted forcibly when desired.

If the rack bars 601 be moved rearwardly beyond their normal extent of movement, inclined surfaces on the dogs 611 will contact with the ends of the slots 612 and cam these dogs down to a position below the plates 613, when movement of the rack bars can be continued still further in a rearward direction until the front ends of the bars pass beyond the pinions 605. This will release the shaft 606, which can then drop down in the slots 620 in the walls 600, it being held in elevated position in these slots only by reason of the engagement of the pinions 605 with the rack bars 601. It will be noted from Fig. 7 that the slots 620 are widened in their lower portions and of larger size than the diameter of the pinions 605, so that when the shaft 606 is released and drops downwardly, it will be moved endwise out of the machine, the pinions 605 passing through the holes 620 without the necessity of removing the pinions from the shaft in order to get the shaft out. Thus a simple and effective construction is provided which can be readily assembled and disassembled. To prevent accidental disengagement of the racks from the pinions a removable screw 601a is provided to limit the rearward motion of the racks.

Casing

Suitable casing means is provided around the machine both to protect it from dust and dirt, and to furnish a more attractive and ornamental appearance.

The top flanges 36 and 68 of the respective keyboard units provide smooth surfaces for the keyboard part of the machine, fitting tightly against each other, so that no other casing is needed at this point. The machine is provided, however, with side plates 650 having their front, rear, and upper edges bent inwardly to form flanges 651 (Figs. 8, 9, and 10) which overlie and contact with small outwardly extending flanges 652 on small channel members 653 which extend along and embrace the front, top, and back edges of the side plates 30. The plates 650 may be held against lateral displacement in any suitable manner, as by brackets 655 (Figs. 3 and 8) welded or otherwise secured to the inner faces of the side plates 650 and held to the plates 30 as by means of screws 656 accessible from between the side plates 30 near the front and rear ends of the machine, when the front and back casing plates are removed.

The front casing member 665 (best shown in Fig. 4) extends in width from the edge of one of the strips 653 to the edge of the other strip 653 and covers the substantially vertical front of the machine, having an upper end curved rearwardly and extending obliquely upwardly to overlie the front ends of all of the keyboard elements, and a lower end curving downwardly and rearwardly as shown in Fig. 4 and terminating approximately under the ribbon supply spool 450. The lower end of this casing member 665 is held in place by means of hook-like ends 666 on brackets secured to the inner surface of the casing member, which engage lugs 667 (Figs. 4 and 8) formed from the member 452. The upper part of the front casing member 665 is held by a movable latch 668 which engages a lug 669 secured to an angle plate 77 and which is held in latching position by a spring 670 although it may be unlatched by means of an externally accessible handle 671. When the latch 668 is unlatched, the upper end of the front casing member 665 may be swung outwardly or forwardly, the hooks 666 at the lower end may then be released from the lugs 667, and this casing plate can be entirely removed from the machine, giving access to the front end of the mechanism and permitting the ribbon supply spool 450 to be removed for replacement if desired.

The rear casing plate 675 is similarly held at its lower end by hook-like members 676 which engage lugs 677 (Figs. 4, 5, and 10) formed from the plates 480, the upper portion of the rear casing member 675 curving forwardly as shown, for example, in Figs. 4 and 5 and thence extending slightly downwardly to overlie the rear or upper ends of the keyboard elements. The upper end is latched in position by any suitable latching mechanism such as that shown diagrammatically in Fig. 7 at 680, controlled by an externally accessible member 681 which can be shifted from the outside of the casing to unlatch this rear plate so that it may be readily removed.

When the front plate 665 and the rear plate 675 are both removed, access is then obtained to the screws 656 holding the side plates 650, so that the side plates of the casing can be removed and the mechanism can then be disassembled or various parts removed as desired.

The various casing walls above mentioned extend down approximately to the horizontal plane of the slot 245 which receives the check or instrument to be printed. Below this slot there is a base casing of stepped construction shown particularly in Figs. 2, 8, and 10, and comprising an angular plate running along the lower part of each side of the machine, each such plate having a vertical wall 685 joined by a curve to a top horizontal wall 613 which is the wall having the slot 612 therein for the paper guide dog 611, as previously described. The bottom edge of the wall 685 rests on a somewhat similar angular plate 690 and is fixed to it by screws 691 which pass through brackets 692 welded or otherwise secured to the inner surface of the plate 685. The inner end of each bracket 692 is spaced slightly from the under surface of the plate 613 as shown at 694 and is preferably somewhat resilient, and in the space between these parts there is slidably received and frictionally maintained an outwardly extending flange 695 formed at the top edge of the base plate 600. Screws 697 (Fig. 10) passing through parts of the plate 690 and through ears 698 struck out from the wall 600, serve together with the frictional clip 694, to hold these sides of the lower casing in place.

The front and back portions of the lower casing may be similarly formed, the front portion including a plate 700 (Figs. 4, 5, 6, and 8) which extends horizontally from the front edge of the base casing back to a point slightly in front of the printing line of the machine and which, together with the surfaces 613, forms a substantially flat support for the paper to be printed upon. The side edges of the plate 700, as shown in Fig. 8, may be slightly offset and enter between the parts 613 and 695, so that they are held in position by the side portions of the base casing and when these side portions are removed, the edges of the plate 700 are freed for removal. The rear portion of the base casing may be of similar stepped formation and formed as indicated at the right hand ends of Figs. 4 and 5, extending across the machine from one of the channel shaped members 653 to the other. A bottom plate 705 is preferably also provided, screwed or otherwise suitably secured to the bottom of the frame work so that the platen mechanism and associated parts are substantially completely enclosed.

Summary

The operation of each individual part of the machine has been fully described in detail in the course of the foregoing description of the construction of the mechanism. It is unnecessary, therefore, to give a complete explanation of the operation of the whole machine, but a brief summary will now be given, with reference to a typical operation.

Suppose it is desired to print the amount $307.00 on a check or draft. The "3" key 40 in the hundreds of dollars denomination is accordingly depressed, and also the "7" key 40 in the units of dollars denomination. This projects the lower ends of the respective depressed key stems 38 into the positions illustrated in Figs. 5 and 17, in which the set "3" key of the hundreds of dollars denomination is shown at A and the set "7" key of the units of dollars denomination is shown at B.

Next the operator pulls forwardly on the operating lever 251. This turns the shaft 250 in a clockwise direction when viewed as in Fig. 7 or in a counterclockwise direction when viewed as in Figs. 4, 5, and 6.

Almost immediately after the beginning of the rotation of the shaft 250, the lower rear corner of the left hand cam disk 300 leaves the tail of the lever 331 (Fig. 6) and allows this tail of the lever to move forwardly, which moves the link 178 rearwardly, throws the bail 175 downwardly from its upper position shown in Figs. 4 and 6 to its lower position shown in Figs. 5 and 11, and allows the springs 171 to move the zero stop levers 150 in all denominations in which no key has been set. In the hundreds of dollars denomination the "3" key has been set and consequently the controller lug 70 of this denomination will lie in the path of the end 151 of the zero stop lever 150 of this denomination and prevent the lever from moving upwardly to a sufficient extent to set the zero stop 153 of this denomination. Similarly the zero stop 153 of the units of dollars denomination will not be set because the "7" key has been depressed in this denomination with consequent forward movement of the control lug 70 of this denomination. But in the other denominations, including the units and tens of cents, the tens of dollars, the thousands of dollars, and all higher denominations to the extreme capacity of the machine, the control lugs 70 will be in a forward position, will be out of alinement with the ends 151 of the levers 150, and will not interfere with movement of these levers to the positions shown in Figs. 11 and 12, in which positions the zero stop 153 will be projected rearwardly to effective set position.

This movement of the zero stop levers 150 in the thousands of dollars denomination and all higher denominations will withdraw the tails 170 of these levers so that the blank stop levers 160 in all these denominations can likewise move to the positions shown in Fig. 11, which will set the blank stops 166 of the thousands of dollars denomination and all higher denominations, which in turn will cause the machine to omit the printing of any figure above the hundreds of dollars denomination. In the hundreds of dollars denomination itself, however, in which a key has been set, the tail 170 will hold the blank stop lever 160 in the position shown in Fig. 5, so that the blank stop 166 in this denomination will not be set. The lug 162 on the blank stop lever 160 of this denomination will hold the blank stop lever of the tens of dollars denomination likewise in ineffective position so that the blank stop in the tens of dollars denomination will not be set. There are no blank stops in the units of dollars denomination and units and tens of cents denominations; but if such blank stops did exist they also would be held in an ineffective position because of the lugs 162 on each blank stop lever 160 overlapping the blank stop lever of the next lower denomination.

Thus practically at the outset of the movement of the operating lever 251, the blank stop and zero stop mechanism is set into operation to set zero stops in each denomination where no other numeral is to be printed, and the set blank stops in all denominations above the highest significant digit. At substantially the same time that this setting of the stops is taking place, the pin 326 (Fig. 7) rides from under the end 325 of the lever 317, which allows the spring 327 to turn this lever in a counterclockwise direction about its shaft 305, which throws the locking bail 306 up against the tails of all of the levers 307 (Fig. 5) to the position shown in Fig. 5 and soon thereafter the concentric surfaces 302 on the cam disks 300 ride under the ends 316 and 318 of the levers 315 and 317, and holds the levers in their upper positions, forcibly holding the locking bail 306 up against the levers 307 and thus locking the keyboard so that no further keys can be depressed.

While this is taking place, the cam 341 (Fig. 7) is actuating on the follower roller 342 to move the operating member 343 in a counterclockwise direction about its shaft 125. As this member 343 moves, the pin 491 thereon operates the lever 490 of the ribbon feeding mechanism and gives a slight feeding movement to the ribbon. After the operating member 343 has turned a short distance, the pin 344 thereon passes dead center and the link 345 (Figs. 4 and 7) pulls the gear segment 115 in a direction to throw the bail 113 (Figs. 4, 5, and 17) upwardly and rearwardly from a position such as shown in Figs. 4 and 17 to a position shown in Fig. 5. During this movement of the bail 113, all of the drivers 85 in all of the denominations are turned through a corresponding movement and, through the respective latches 90, these drivers will turn the type disks 81 about the shaft 86 until the arm 110 on the controller 84 of each respective type disk strikes a stop.

In the thousands of dollars denomination and all of the higher denominations, the arms 110 will strike the blank stops 166 which have been set to effective position in all of these denominations. Even though the zero stops have also been set in these denominations, the blank stops will be the effective ones because in the swinging movement of the controller arms 110, the blank stops are reached before the zero stops. Consequently, in all of these higher denominations, the controller arms 110 will move only through a slight arc until they strike the respective blank stops 166, such an arm in contact with such a stop being illustrated in Fig. 11.

In the tens of dollars and units and tens of cents denominations, the respective controller arms 110 will move one step farther and strike the zero stops which are set in these denominations, this position of a controller in contact with a zero stop being illustrated in Fig. 12.

In the hundreds of dollars denomination, the controller arm 110 will move still further until it strikes the set stop of the "3" key, illustrated at A in Fig. 5, with the stop arm in contact with it. Similarly in the units of dollars denomination, a still greater movement of the controller arm 110 takes place, this arm moving until it strikes the set "7" key stop shown at B in Fig. 5.

As the respective controller arms 110 of the various denominations strike their respective stops above mentioned, each controller arm then shifts the latch 90 of its own denomination and unlatches the type disk 81 from the driver 85, at the same time latching it to the locking member 88 by moving the pin 95 on the latch into an appropriate notch 98 of the locking member. In this way the type disks 81 are each set to its proper position and latched immovably in that position although the drivers 85 all continue to swing through their full range of movement.

Soon after the setting of the type disks begins, the cam 350 (Fig. 6) allows follower roller 225 to move rearwardly, which allows the arm 223 to move downwardly and allows the spring 220 (Figs. 6 and 9) to pull the arm 218 downwardly, which shifts the arm 212 rightwardly and carries the prefix character 200 rightwardly until it stops in contact with the highest denomination type segment which has been shifted beyond its blank position. In this instance, the prefix character would abut against the hundreds of dollars type segment, for this type segment has been shifted beyond its blank position and all of the higher denomination type segments are set only in their blank or non-printing positions.

All parts of the machine are now ready for printing and the operating handle 251 has completed roughly about one-half of its forward movement. The operator then continues to move the operating handle in a forward and downward direction and the actual printing operation takes place. The upper ends of the slots 225 (Figs. 4 and 5) force the shaft 256 downwardly, swinging the lever 257 to raise the platen carrier 261 and to force the platen 262 up against the under side of a piece of paper which has been interposed in the paper receiving slot 245 of the machine. As the platen moves up from the position shown in Fig. 4 to the position shown in Fig. 5, it slightly raises the check indicated in Fig. 5 by the letter C, and presses it with great pressure against the type surfaces, or rather, against the lower side of the inking ribbon 470 which is interposed between the paper C and the printing types. Thus the inking ribbon causes a printed impression to be made on the paper corresponding to the characters on the type which are alined with the platen, and preferably at the same time the amount line of the check is embossed or mascerated, the cooperating surfaces of the platen and of the type elements being roughened or provided with embossing ridges for this purpose.

The full stroke pawl 362 is operative on the ratchet teeth 361 (Fig. 6) to insure a full movement of the handle through this latter part of its movement, so that the check will be properly printed under the intended full pressure. When the full stroke pawl has slipped past the last tooth of its ratchet, the handle 251 can be swung upwardly and rearwardly to its normal position, which returns all of the parts to normal idle position and clears the keyboard unless the repeat key 390 has previously been depressed and latched in its depressed position.

If it is desired to crimp or emboss the payee line of the check, the check C is not yet removed from the machine but is allowed to remain in the same position. The crimping key 577 (Fig. 10) is then depressed and held down while the operating handle 251 is once more pulled forwardly and this time the platen carrier 261, because of the interposition of the flange 559 (Fig. 6) raises the crimping platen 552 and crimps or embosses the check, pushing it upwardly against the crimping teeth 551.

It will be seen that the mechanism is fairly simple in comparison to other check writing machines capable of accomplishing comparable results. It is reasonably light, compact, and attractive in appearance. Furthermore, it is to be noted that many parts of the machine are assembled in units which can be readily removed and replaced, thus facilitating assembly of the machine in the first place and repair of it when repair is necessary.

For example, the keyboard mechanism is built up of a number of separate denominational units, and each denominational unit may be bodily lifted out without difficulty. The rear or winding ribbon spool and its associated operating mechanism likewise forms a single unit which may be readily taken out when its mounting plates 480 are removed. The front ribbon spool may be readily taken out of the machine as previously described. The zero and blank stop unit contained in the channel member 141 is also readily removable by withdrawing the screws which engage the rods 146 and 147. The type members are all mounted on a shaft 86 and can be easily taken out when this shaft is removed. And the prefix character 200 can be pulled sideways off of its carrier 193 simply by removing the left hand casing plate 650 and pulling leftwardly on the handle 208 (Fig. 18) secured to the prefix character. This ready removability of the prefix character is especially desirable because frequently the purchaser of a machine of this kind wants a special prefix character made up with his name or other special printing matter on it, and when the prefix character can be changed readily and easily as in the present instance, it is but the work of a moment to substitute one prefix character with the desired printing type on it for another prefix character with different type matter on it.

It is obvious that many features of the machine are useful not only in check writers, but also in kindred machines such as other forms of printing machines, or adding machines, or combined printing and adding machines.

Certain keyboard structure and associated parts disclosed but not claimed in the present application are claimed in my application Serial No. 124,709, filed February 8, 1937, for Keyboard construction, which application is a division of this present application.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. The combination of a differentially settable denominational member mounted for rotation about an axis, a series of settable stops, a driver mounted for rotation about said axis, a latch for connecting said denominational member to said driver, and a latch controller also mounted for rotation about said axis and having a part for engaging a set one of said stops, said controller being operatively connected to said latch so that relative rotational movement in one direction between said controller and said denominational member, about said axis as a center, will unlatch said denominational member from said driver.

2. A denominational assemblage comprising, in combination, a differentially settable denominational member mounted for rotation about an axis, a driver mounted for rotation about the same axis, a controller mounted for rotation about the same axis, a locking member mounted for adjustment about the same axis as a center but normally held in stationary position, and a latch member pivotally mounted on said denominational member and operatively connected to said controller to be moved thereby from a position latching said denominational member to said driver, to a second position unlatching said denominational member from said driver and latching it to said locking member.

3. A denominational assemblage comprising, in combination, a differentially settable denominational member mounted for rotation about an axis, said member having a laterally extending flange concentric with said axis, a controller rotatably mounted on said flange next to said member, a driver rotatably mounted on said flange on the opposite side of said controller from said member, and a latch pivotally mounted on said member in the plane of said controller and having a part for engagement with said controller to be moved thereby and another part extending laterally into the plane of said driver to be latched thereto and unlatched therefrom.

4. The combination of a shaft, a series of differentially settable denominational members all mounted for independent rotation on said shaft, a series of drivers mounted for rotation about said shaft, one associated with each of said members, a bail connected to all of said drivers, means for swinging said bail through a predetermined path of travel to carry all of said drivers concomitantly through a corresponding path, a latch pivotally mounted on each of said members for latching said members to their respective associated drivers, and a series of controllers, one associated with each of said members, each of said controllers being mounted for rotary movement relatively to its associated member about said shaft as a center, each controller being operatively connected to the latch mounted on its associated member, and certain of said controllers having laterally extending arms adapted to cooperate with stops offset laterally from the planes of said members.

5. A check writer comprising a prefix type carrier movable in a direction along a printing line, a type character removably mounted on said carrier, and cooperating projections and grooves on said carrier and character for removably holding the character on the carrier, said projections and grooves extending in a direction substantially parallel with said printing line so that said character may be removed from said carrier by a movement relatively to the carrier in a direction substantially along the printing line.

6. A check writer comprising a prefix type carrier movable in a direction along a printing line, a type character removably mounted on said carrier, cooperating projections and grooves on said carrier and character for removably holding the character on the carrier, said projections and grooves extending in a direction substantially parallel with said printing line, said type character having a notch therein, and detent means pivotally mounted on said carrier for engaging said notch to tend to hold said character against displacement relatively to said carrier.

7. A check writer comprising a series of amount printing types selectively settable to a predetermined printing line, a member having a portion movable toward and away from said printing line, platen means pivotally mounted on said portion of said member and arranged, when in predetermined position thereon, to cooperate with said type set to said printing line when said portion of said member is moved toward said printing line, and movable linkage means for holding said platen means in said predetermined position with respect to said carrier, said linkage means including a first link pivoted at a point removed from said platen means, a second link pivoted to said first link, and a pivotal connection between a fixed point of said second link and a fixed point of said platen means at a point spaced from the pivotal connection between said platen means and said movable member.

8. A check writer comprising a series of amount printing types selectively settable to a predetermined printing line, amount printing platen mechanism including parts movable toward and away from said line for cooperation with said type set to said line and also including means for moving said parts, a payee crimping plate adjacent said printing line, a payee crimping platen movable toward said plate to cause crimping of a payee designation on an instrument inserted between said plate and said payee platen, and means for operatively connecting said payee platen to said parts of said platen mechanism so that operation of said moving means will, by movement of said parts toward said printing line, move said payee platen toward said crimping plate to crimp an instrument between them.

9. A check writer comprising an amount printing platen movable toward and away from printing type, a shoulder associated with said platen and movable therewith, a crimping platen adjacent said printing platen, a connecting element, and means for selectively interposing said connecting element between said shoulder and said crimping platen so that when said printing platen and shoulder move toward said type, said interposed element will cause movement of said crimping platen.

10. A check writer comprising a frame including two spaced elements, a pair of mounting plates, one removably connected to each element, a ribbon spool extending between and mounted on said plates, and spool turning mechanism mounted on one of said plates, said spool and said turning mechanism being bodily removed from said frame as a unit by removing said mounting plates from said frame.

11. A check writer comprising selectively settable printing type, a platen for cooperation with said type, a removable spool for holding a supply of inked ribbon to be interposed between said type and said platen, operating mechanism for causing relative movement of said type and platen, and means operative automatically upon removal of said spool for blocking movement of said operating mechanism.

12. A check writer comprising a ribbon spool, a ratchet operatively connected to said spool, a feeding pawl, resilient means tending to hold said feeding pawl in engagement with said ratchet, means for moving said feeding pawl to feed said ratchet and spool, a holding pawl, resilient means tending to maintain said holding pawl in engagement with said ratchet, latch means for holding one of said pawls out of engagement with said ratchet, and means on said one of said pawls effective when it is held out of engagement by said latch means, to hold the other of said pawls out of engagement with said ratchet.

13. A check writer comprising printing means, operating mechanism for operating said printing means, a ribbon spool, a feeding pawl, resilient means tending to hold said feeding pawl in engagement with said ratchet, means for moving said feeding pawl to feed said ratchet and spool, a holding pawl, resilient means tending to maintain said holding pawl in engagement with said ratchet, latch means for holding one of said pawls out of engagement with said ratchet, and means effective upon the next succeeding operation of said operating mechanism for releasing said latch means so that said resilient means associated with said one of said pawls may move said pawls into engagement with said ratchet.

14. A check writer comprising a pair of mounting plates spaced from and substantially parallel to each other and having front, back, and top edges, a U-shaped member fitting over and embracing the front, back and top edge of each of said plates, a side casing plate overlying the outer surfaces of each of said mounting plates and engaging the U-shaped member embracing the edge of its associated mounting plate, and front and back casing plates interposed between the U-shaped member embracing one of said mounting plates and the U-shaped member embracing the other of said mounting plates.

15. A check writer comprising a frame including a flange, a casing plate overlying said flange to cover said flange when the casing plate is in normal position, and a member secured to the inner side of said casing plate and having a tongue portion approximately parallel to and spaced from a portion of said casing plate and forming a resilient clip, so that said flange may be engaged between said tongue and said portion of said casing plate to hold said casing plate in predetermined position with relation to said frame.

16. A check writer comprising a frame including a flange, a casing plate overlying said flange to cover said flange when the casing plate is in normal position, and a member secured to the inner side of said casing plate and having a tongue portion approximately parallel to and spaced from a portion of said casing plate and forming a clip so that said flange may be engaged between said tongue and said portion of said casing to be frictionally retained therebetween to hold said casing plate in predetermined relationship to said frame.

17. A denominational assemblage comprising, in combination, a differentially settable denominational member mounted for rotation about an axis, a centering member mounted for adjustment about the same axis as a center, means for latching said denominational member to said centering member, and eccentric adjusting means offset from said axis for controlling the position of said centering member, said eccentric adjusting means being turnable to different positions to adjust said centering member to different positions about said axis.

18. A denominational assemblage comprising, in combination, a differentially settable denominational member mounted for rotation about an axis, a centering member mounted on the same axis, a series of recesses associated with said centering member, means connected to said denominational member for entering one or another of said recesses, and resilient means tending to turn said denominational member in one direction to hold said means connected to said denominational member always against a corresponding side of any recess into which it may enter.

19. A denominational assemblage comprising, in combination, a differentially settable denominational member mounted for rotation about an axis, a controller also mounted for rotation about said axis, a driver likewise mounted for rotation about said axis, a locking member, and a latch pivotally mounted on said denominational member and having a part for engagement with said controller to be moved thereby and another part for cooperation with said driver to be latched thereto and unlatched therefrom and another part for cooperation with said locking member to be engaged therewith to hold said denominational member in fixed position with respect to said locking member.

20. Printing mechanism including a series of denominational type elements selectively settable to a printing line, a prefix type element movable in a direction along said printing line, means including a fulcrumed lever for moving said prefix element along said printing line, and eccentric means forming a fulcrum for said lever and turnable to different positions to adjust the position of said lever and of said prefix element.

21. The combination of differentially settable denominational members, key mechanism for controlling the positions of said denominational members, said key mechanism including a plurality of banks of depressible keys and a member in each bank of keys having one position when no key in its bank has been depressed and being shifted from said position by the depression of any key in its bank, operating mechanism for said denominational members, said operating mechanism including a disk having a position of rest and being movable through an operating cycle from said position, and means cooperating with said disk for preventing shifting of said key bank members to prevent depression of any of said keys whenever said disk has been moved substantially from said position of rest.

22. The combination of differentially settable denominational members, key mechanism for controlling the positions of said denominational members, said key mechanism including a plurality of banks of depressible keys and a member in each bank of keys having one position when no key in its bank has been depressed and another position while any key in its bank is incompletely depressed, operating mechanism for said denominational members, said operating mechanism including a disk having a position of rest and being movable therefrom through an operating cycle, and means cooperating with said disk and with said key bank members for preventing substantial movement of said disk from said rest position whenever any key in any of said banks of keys remains incompletely depressed.

23. The combination of a plurality of banks of depressible keys, a key locking bar associated with each bank of keys, each locking bar being moved by depression of any key in its bank and each being effective, upon movement to a predetermined position, to release all previously depressed keys in its bank, a plurality of levers, one operatively connected to each locking bar, said levers having ends substantially alined with each other, two bails mounted for rotation about a common axis, said bails embracing between them said ends of said levers, means for holding one of said bails in position to prevent substantial movement of all of said levers and thus to prevent substantial movement of all of said locking bars to prevent depression of any of said keys, and means for shifting the other of said bails to move all of said levers and locking bars to release all previously depressed keys.

24. The combination of a plurality of settable elements, an element locking member having a part associated therewith and movable therewith, a shaft, a locking bail rotatably mounted on said shaft for cooperation with said part, and a clearing bail also rotatably mounted on said shaft for cooperation with said same part.

25. The combination with a ribbon spool having a trunnion, of means forming a slot for receiving said trunnion, said slot extending in a direction transverse to the axis of said trunnion and having a closed end and an open end, a latching member mounted for movement from a latching position holding said trunnion in said closed end of said slot to an unlatched position in which said trunnion may be moved along said slot to said open end thereof, and an operating member for controlling said latching member.

26. Printing mechanism comprising a type element and a platen element, operating means for moving one of said elements toward the other of said elements, a ribbon spool for holding a supply of inked ribbon to be interposed between said type element and said platen element, and means effective upon the exhaustion of ribbon from said spool for locking said operating means against operation.

27. The combination of a first platen movable through a range of movement from an ineffective position of rest to an effective position, a second platen movable through a lesser range of movement from an ineffective position of rest to an effective position, common operating means for said two platens, settable mechanism for determining which of said platens shall be moved to its effective position upon movement of said operating means, and blocking means operated by said settable mechanism for limiting the extent of movement of said operating means whenever said settable mechanism is set to cause effective movement of said platen having the lesser range of movement.

28. A checkwriter comprising a series of differentially settable denominational members having printing characters associated therewith and settable to a predetermined printing line, key mechanism for controlling the position of said denominational members, said key mechanism including a series of corresponding banks of depressible key stops for controlling the positions to which the respective denominational members are set, a printing platen movable into cooperation with the characters positioned at said printing line, and stop mechanism for controlling any denominational member when no key stop has been depressed in the bank corresponding thereto, said stop mechanism comprising transversely extending means, stop controlling elements rotatably mounted on said means, and stop members controlled by said elements and adapted to be moved thereby into effective positions for controlling said denominational members, said means, elements, and stop members being connected together to form an assemblage capable of being handled as a unit independently of said denominational members.

29. A checkwriter comprising a series of differentially settable denominational members having printing characters associated therewith and settable to a predetermined printing line, key mechanism for controlling the position of said denominational members, said key mechanism including a series of corresponding banks of depressible key stops for controlling the positions to which the respective denominational members are set, a printing platen movable into cooperation with the characters positioned at said printing line, and a stop mechanism unit for controlling any denominational member when no key stop has been depressed in the bank corresponding thereto, said stop mechanism unit comprising two shafts, a series of zero stop controlling elements rotatably mounted on one shaft, a series of blank stop controlling elements rotatably mounted on the other shaft, a series of zero stops and a series of blank stops operatively connected to the respective elements, and guiding means for said stops, and stop mechanism for controlling any denominational member when no key stop has been depressed in the bank corresponding thereto, said stop mechanism comprising transversely extending means, stop controlling elements rotatably mounted on said means, and stop members controlled by said elements and adapted to be moved thereby into effective positions for controlling said denominational members, said means, elements, and stop members being connected together to form an assemblage capable of being handled as a unit independently of said denominational members.

30. A checkwriter comprising a series of differentially settable denominational members having printing characters asociated therewith and settable to a predetermined printing line, key mechanism for controlling the position of said denominational members, said key mechanism including a series of corresponding banks of depressible key stops for controlling the positions to which the respective denominational members are set, a printing platen movable into cooperation with the characters positioned at said printing line, and a stop mechanism unit for controlling any denominational member when no key stop has been depressed in the bank corresponding thereto, said stop mechanism unit comprising two shafts, a series of zero stop controlling elements rotatably mounted on one shaft, a series of blank stop controlling elements rotatably mounted on the other shaft, means interconnecting each of the blank stop controlling elements to one of the zero stop controlling elements to be controlled thereby, means interconnecting each of the blank stop controlling elements to the adjacent blank stop controlling element on one side thereof to influence the position thereof, and stop members operatively connected to said elements.

31. The combination of differentially settable denominational members having a series of printing characters, a series of settable stops, positioning means for moving said denominational members into engagement with predetermined stops so as to position said denominational members with selected characters at a printing line, platen mechanism operative to cooperate with said denominational members, ink ribbon advancing mechanism, a shaft, operating means for turning said shaft, an operative connection between said operating means and said platen mechanism, and means operatively connecting said shaft to said positioning means and to said ribbon advancing mechanism, said connecting means including a cam mounted on said shaft, said cam having a portion for actuating said positioning means and said ribbon advancing mechanism through one part of the cycle of operation of said operating means, and another portion concentric with said shaft for maintaining said positioning means and ribbon advancing mechanism at rest during another part of the cycle of operation of said operating means, said operative connection being effective to operate said platen mechanism during said other part of said cycle.

32. The combination of differentially settable denominational members mounted for rotation about an axis, operating means for said denominational members including a bail mounted for rotation about the same axis, said bail having a toothed portion, an operating shaft, a gear segment mounted for rotation on said shaft and meshing with the toothed portion of said bail, a cam rigid with said operating shaft, and means operatively connecting said gear segment to said cam, said cam having a portion for actuating said gear segment through a part of the cycle of operation of said shaft and another portion concentric with said operating shaft adapted to retain said gear segment and said bail at rest during another part of the cycle of operation of said operating shaft.

33. A check writer comprising a series of amount printing type characters selectively settable to a predetermined printing line, amount printing platen mechanism movable toward and away from said line for cooperation with any type character positioned at said line, a payee crimping plate adjacent said printing line, a payee crimping platen movable toward said plate to cause crimping of a payee designation on an instrument inserted between said plate and said payee platen, means for operatively connecting said payee platen to said printing platen mechanism, said means including a payee platen selector, a pivoted yoke operatively connected to said selector, an insert member connected to said yoke and adapted to be interposed between portions of said printing platen mechanism and said payee platen by movement of said selector, and means for moving said printing platen mechanism toward said characters set at said printing line, such movement of said printing platen mechanism being effective, when said insert member is interposed between said printing platen mechanism and said payee platen, to move said payee platen toward said crimping plate to crimp an instrument between them.

34. A check writer according to claim 33, further including stop means movable by said selector for limiting the extent of movement of said means for moving said printing platen mechanism whenever said insert member is operatively interposed between said printing platen mechanism and said payee platen to an extent sufficient to cause effective operation of said payee platen but insufficient to cause effective cooperation of said printing platen mechanism with said characters set at said printing line.

35. The combination of a denominational member differentially settable to a predetermined position and mounted for rotation about an axis, a controller mounted for rotation about the same axis, a locking member mounted for adjustment about said axis as a center but normally held in stationary position, latching means carried by said denominational member and capable of being moved into engagement with said locking member at various positions relatively thereto, and resilient means connecting said denominational member to said controller, said resilient means permitting said denominational member and said controller to move relatively to each other and said resilient means constantly tending to turn said denominational member in one direction about said axis, so that said latching means will constantly tend to move in one direction relatively to said locking member to hold said denominational member accurately in the desired position notwithstanding play between said latching means and said locking member.

36. The combination of differentially settable denominational members, key mechanism for controlling the positions of said denominational members, said key mechanism including a plurality of banks of depressible keys and a member in each bank of keys having one position when no key in its bank has been depressed and being shifted from said position by the depression of any key in its bank, a yoke member mounted for rotation about an axis, said yoke member being operative to engage said key bank members, actuating means for said yoke member including a control member associated therewith, said control member being mounted for movement about said axis, operating mechanism for said denominational members, said operating mechanism including a disk having a position of rest and being movable through an operating cycle from said position, said control member having an extending portion cooperating with said disk when it is in the position of rest and out of cooperation therewith when the operating mechanism has been moved substantially from said position of rest, said actuating means and said control member being rendered effective to move said yoke member when said disk moves out of cooperation with said control member.

37. The combination of differentially settable denominational members, key mechanism for controlling the positions of said denominational members, said key mechanism including a plurality of banks of depressible keys and a member in each bank of keys having one position when no key in its bank has been depressed and being shifted from said position by the depression of any key in its bank, a yoke member mounted for rotation about an axis, said yoke member being operative to engage said key bank members, actuating means for said yoke member including a control member associated therewith, said control member being mounted for movement about said axis, operating mechanism for said denominational members, said operating mechanism including a disk having a position of rest and being movable through an operating cycle from said position, said control member having an extending portion normally cooperating with said disk when it is in the position of rest and out of cooperation therewith when the operating mechanism has been moved substantially from said position of rest, said actuating means being rendered effective to move said yoke member when said disk moves out of cooperation with said control member, said control member also having a second extending portion normally out of engagement with said disk when said disk is in the position of rest, and adapted to cooperate with said disk whenever said disk is moved substantially from said position of rest to retain said yoke member in a position to prevent shifting of said key bank members.

38. The combination of differentially settable denominational members, key mechanism for controlling the positions of said denominational members, said key mechanism including a plurality of banks of depressible keys and a member in each bank of keys having one position when no key in its bank has been depressed and being shifted from said position by the depression of any key in its bank, a yoke member mounted for rotation about an axis, said yoke member being movable from an initial position out of the paths of travel of said key bank members to a second position obstructing the paths of travel of said key bank members, actuating means for said yoke member including a control member associated therewith, said control member being mounted for movement about said axis, operating mechanism for said denominational members, said operating mechanism including a disk having a position of rest and being movable through an operating cycle from said position, said control member having an extending portion normally cooperating with said disk when it is in the position of rest and out of cooperation therewith when the operating mechanism has been moved substantially from said position of rest, said actuating means being rendered effective to move said yoke member when said disk moves out of cooperation with said control member, said yoke member also having an extending latch portion, said operating mechanism also including a second disk having a position of rest and being movable through an operating cycle from said position, said latch portion lying in the path of said second disk to block substantial movement thereof when said yoke member is in its said initial position and being moved out of the path of said second disk upon movement of said yoke member to its said second position so that said second disk and said operating mechanism may move through their operating cycles without being blocked by said latch portion.

39. A check writer comprising a series of differentially settable denominational members having printing characters associated therewith and settable to a predetermined printing line, key mechanism for controlling the position of said denominational members, said key mechanism including a plurality of banks of depressible keys, a key locking bar associated with each bank of keys, each locking bar being moved by depression of any key in its bank and each being effective, upon movement to a predetermined position, to release all previously depressed keys in its bank, a plurality of levers, one operatively connected to each locking bar, said levers having ends substantially alined with each other, locking bail mechanism operative to prevent substantial movement of all of said levers, clearing bail mechanism for moving all of said levers and locking bars to release all previously depressed keys, and repeat key mechanism including a movable member effective when shifted to one position to retain said locking bail mechanism in an effective position and to render said clearing bail mechanism inoperative.

40. A check writer comprising a plurality of movable denominational members, a series of type characters mounted on each denominational member, means for selectively setting said denominational members to bring selected type characters thereon to a predetermined printing line, means including a plate for supporting a sheet of paper in position to receive an impression from the type characters at said printing line, said plate having a slot therein, a carrier movable beneath said plate in the direction of said slot, a paper guide dog pivotally mounted on said carrier and projecting upwardly through said slot to a position for contact with an edge of said sheet of paper to determine the position of said edge relatively to said printing line, resilient means tending to move said dog upwardly through said slot, and a lateral projection on said dog contacting with the under side of said plate to limit upward movement of said dog and to provide a frictional brake tending to restrain said carrier against movement.

41. A check writer comprising a plurality of movable denominational members, a series of type characters mounted on each denominational member, a plurality of banks of depressible keys, one controlling each denominational member, means for moving the denominational members into selective positions controlled by the depression of keys in said banks to bring selected type characters on said denominational members to a predetermined printing line, means including a plate for supporting a sheet of paper in position to receive an impression from the type characters at said printing line, two spaced flanges depending from said plate, each flange having an opening therethrough, a shaft extending through both of said openings and rotatable therein, a pair of pinions fixed to said shaft, a pair of rack bars, one meshing with each of said pinions, means for guiding said rack bars for reciprocating movement in mesh with said pinions, and a paper guide member mounted on each rack bar and extending upwardly beyond the top surface of said plate to a position for contact with an edge of said sheet of paper to determine the position of said edge relatively to said printing line, each of said shaft receiving openings in said depending flanges having a narrow part forming a journal for said shaft and a wide part sufficiently large so that said pinions may pass through said wide part while remaining fixed to said shaft, said rack bars serving normally to hold said shaft in engagement with said narrow part of each of said openings and being movable endwise past said pinions to allow said shaft to be shifted transversely to aline said pinions with said wide parts of said openings.

WALTER B. PAYNE.